US012197036B2

(12) United States Patent
Vishnia

(10) Patent No.: US 12,197,036 B2
(45) Date of Patent: Jan. 14, 2025

(54) LOW PROFILE HOLLOW RETROREFLECTOR ASSEMBLY AND THEIR MOUNTING STRUCTURES AND MOUNTING METHODS

(71) Applicant: PLX, Inc., Deer Park, NY (US)

(72) Inventor: Itai Vishnia, Setauket, NY (US)

(73) Assignee: PLX, Inc., Deer Park, NY (US)

( * ) Notice: Subject to any disclaimer, the term of this patent is extended or adjusted under 35 U.S.C. 154(b) by 231 days.

(21) Appl. No.: 16/899,402

(22) Filed: Jun. 11, 2020

(65) Prior Publication Data

US 2021/0389554 A1    Dec. 16, 2021

(51) Int. Cl.
*G02B 5/122*    (2006.01)
*G02B 7/182*    (2021.01)

(52) U.S. Cl.
CPC ............ *G02B 7/182* (2013.01); *G02B 5/122* (2013.01)

(58) Field of Classification Search
CPC . G02B 7/182; G02B 7/00; G02B 7/18; G02B 7/1822; G02B 5/12; G02B 5/122; G02B 5/136; G02B 5/124
USPC ........................................ 359/592, 850, 856
See application file for complete search history.

(56) References Cited

U.S. PATENT DOCUMENTS

| | | | |
|---|---|---|---|
| 3,977,765 A | 8/1976 | Lipkins | |
| 5,122,901 A | 6/1992 | Bleier | |
| 5,227,921 A | 7/1993 | Bleier et al. | |
| 5,301,067 A | 4/1994 | Bleier et al. | |
| 5,335,111 A | 8/1994 | Bleier | |
| 5,361,171 A | 11/1994 | Bleier | |
| 5,486,913 A | 1/1996 | Aharon | |
| 5,589,991 A * | 12/1996 | Bleier | G03B 13/08 |
| | | | 359/857 |
| 5,625,501 A | 4/1997 | Taggert | |
| 5,949,543 A | 9/1999 | Bleier et al. | |
| 6,141,101 A | 10/2000 | Bleier et al. | |

(Continued)

FOREIGN PATENT DOCUMENTS

| | | |
|---|---|---|
| CN | 2233091 Y | 8/1996 |
| CN | 104090316 | 8/2014 |
| CN | 106569324 A | 3/2019 |

OTHER PUBLICATIONS

"Enclose," Merriam Webster Online Dictionary <<https://www.merriam-webster.com/dictionary/enclose>>, Jan. 2023 (Year: 2023).*

(Continued)

*Primary Examiner* — Jennifer D. Carruth
(74) *Attorney, Agent, or Firm* — Ice Miller LLP; Safet Metjahic

(57) ABSTRACT

An improved retroreflector assembly is provided. The retroreflector assembly has a retroreflector comprising three plates having optically flat reflective surfaces disposed at right angles to each other, wherein the retroreflector has a clear aperture distance, and an axis aligned equidistantly from the three plates and extending from a vertex of the retroreflector, a housing for receipt therein of the retroreflector, at least one mounting element extending from the retroreflector, wherein the mounting element at least partially secures the retroreflector to the housing, and a vertical height smaller in distance than the clear aperture distance in a direction parallel to the axis of the retroreflector, and a method for mounting the same.

25 Claims, 28 Drawing Sheets

(56) References Cited

U.S. PATENT DOCUMENTS

| | | | |
|---|---|---|---|
| 6,473,185 B2 | 10/2002 | Vishnia et al. | |
| 6,729,735 B2 | 5/2004 | Bleier | |
| 6,752,503 B2 | 6/2004 | Bleier | |
| 6,786,608 B1 * | 9/2004 | Bleier | G02B 27/646 359/530 |
| 6,827,455 B2 | 12/2004 | Bleier | |
| 6,945,661 B2 | 9/2005 | Bleier | |
| 7,168,817 B2 | 1/2007 | Bleier et al. | |
| 7,268,960 B2 | 9/2007 | Vishnia | |
| 7,995,208 B2 | 8/2011 | Jacobson et al. | |
| 8,083,359 B2 * | 12/2011 | Mohazzab | G02B 5/122 359/549 |
| 8,092,030 B2 | 1/2012 | Bleier | |
| 8,120,853 B2 | 2/2012 | Jacobson et al. | |
| 8,205,852 B2 | 6/2012 | Jacobson et al. | |
| 8,205,853 B2 | 6/2012 | Bleier et al. | |
| 8,454,176 B2 | 6/2013 | Bleier | |
| 8,567,968 B2 | 10/2013 | Bleier | |
| 8,827,468 B2 | 9/2014 | Bleier | |
| 8,827,470 B2 | 9/2014 | Bleier | |
| 8,851,689 B2 | 10/2014 | Bleier et al. | |
| 9,013,814 B2 | 4/2015 | Bleier et al. | |
| 9,097,586 B2 | 8/2015 | Bleier et al. | |
| 9,377,600 B2 | 6/2016 | Vishnia et al. | |
| 9,798,051 B2 * | 10/2017 | Bleier | G02B 7/182 |
| 10,175,395 B2 | 1/2019 | Bleier et al. | |
| 10,222,580 B2 | 3/2019 | Vishnia et al. | |
| 10,393,994 B2 | 8/2019 | Bleier et al. | |
| 2003/0048533 A1 * | 3/2003 | Lyons, III | G02B 5/122 359/850 |
| 2007/0035836 A1 | 2/2007 | Lyons, III | |
| 2021/0124101 A1 * | 4/2021 | Vishnia | G02B 7/182 |

OTHER PUBLICATIONS

International Search Report and Written Opinion issued in PCT/US21/36949, mailed on Oct. 4, 2021.
Canadian Office Action issued in CA Application No. 3,167,788, mailed Sep. 13, 2023. (6 pages).
Supplementary European Search Report issued in EP Application No. 21822681.9, mailed on Feb. 12, 2024. (10 pages).

* cited by examiner

LOW PROFILE HOLLOW RETROREFLECTOR ASSEMBLY AND THEIR MOUNTING STRUCTURES AND MOUNTING METHODS

BACKGROUND OF THE INVENTION

This invention relates to the field of retroreflector assemblies for use as and in optical assemblies. Examples of such retroreflector assemblies include, but are not limited to, flat mirror panels, ball or spherical mounted hollow retroreflectors, hollow retroreflectors, roof mirror assemblies, lateral transfer hollow retroreflectors and periscopes or any combination thereof.

Optical assemblies containing retroflectors have previously been designed with a low aspect ratio (width with respect to height ratio). In a retroreflector assembly, the width is approximately the clear aperture of the retroreflector and height of the retroreflector assembly compared to mirror panels are the size of the retroreflector plus a lengthy base to account for a robust connection between the housing and retroreflector and the housing to an external surface. With a tall assembly, the apex of the retroreflector is at a much higher height relative to the mounting point of the housing to an external surface, which diminishes stability. While some larger sized approaches may be easiest for assembly and manufacturing, specifically regarding part complexity and tolerances, such a design is not necessarily optimized for many design considerations, such as compact sizing, low weight, vibration, shock and thermal effects such as contraction and expansion. Furthermore, during thermal excursion of significant temperatures, these types of thermal effects may translate into degradation of optical performance, such as but not limited to, surface flatness, beam deviation, wavefront shape, peak-to-valley or rms values, optical performance over temperature, shock or vibration, or any combination thereof.

U.S. Pat. No. 5,335,111 to Zvi Bleier, and U.S. Pat. No. 5,361,171 to Zvi Bleier are examples of a retroreflector assembly with such a high aspect ratio design, with a solid tall housing that increases the weight of the overall assembly.

There is a need for a more multifaceted overall design approach that optimizes for a compact low-weight centric design while not diminishing the overall stability of the retroreflector assembly and the optical performance of the retroreflector. The present invention presents a higher aspect ratio design with a height less than the clear aperture, such that the resultant design is an ultra-light and low-profile design. Furthermore, combining this with low-profile mounting methods further increases the stability and functionality of the novel assembly and method.

SUMMARY OF THE INVENTION

The invention accordingly comprises the features of construction, combination of elements and arrangements of parts and sequence of steps which will be exemplified in the construction, illustration and description hereinafter set forth, and the scope of the invention will be indicated in the claims.

It is an object of the invention to provide an improved retroreflector assembly having a structure that minimizes the size and weight of the retroreflector assembly while also minimizing the effect of thermal contraction, expansion or the combination of the effects on the optical performance of such a retroreflector assembly. Such a design is advantageous for size limited applications, and where a robust design is need such that the assembly can withstand vibration and shock without significant differences in performance.

It is a particular object of the invention to provide an improved retroreflector assembly having improved optical performance.

In accordance with the invention an improved retroreflector assembly is provided. The retroreflector assembly has a retroreflector comprising three plates having optically flat reflective surfaces disposed at right angles to each other, wherein the retroreflector has a clear aperture distance, and an axis aligned equidistantly from the three plates and extending from a vertex of the retroreflector, a housing for receipt therein of the retroreflector, at least one mounting element extending from the retroreflector, wherein the mounting element at least partially secures the retroreflector to the housing, and a vertical height smaller in distance than the clear aperture distance in a direction parallel to the axis of the retroreflector.

In accordance with an additional aspect of the invention, an improved retroreflector assembly is provided. The retroreflector assembly has a retroreflector comprising three plates having optically flat reflective surfaces disposed at right angles to each other, wherein the retroreflector has a clear aperture distance, and an axis aligned equidistantly from the three plates and extending from a vertex of the retroreflector, a housing for receipt therein of the retroreflector, and at least one screw-based mounting element extending from the retroreflector, wherein the mounting element at least partially secures the retroreflector to the housing by interfacing directly into at least one of the plates and the mounting element is captured within the housing.

In accordance with a further aspect of the invention, an improved method for a retroreflector assembly is provided. The method for a retroreflector assembly having a retroreflector comprising three plates having optically flat reflective surfaces disposed at right angles to each other, wherein the retroreflector has a clear aperture distance, and an axis aligned equidistantly from the three plates and extending from a vertex of the retroreflector, a housing for receipt therein of the retroreflector, at least one mounting element extending from the retroreflector, wherein the mounting element at least partially secures the retroreflector to the housing, and a vertical height smaller in distance than the clear aperture distance in a direction parallel to the axis of the retroreflector. The steps of the method are joining at least the first clamping means to the retroreflector assembly and attaching at least the first clamping means to another device.

The present invention and one or more components thereof may also be used in conjunction with any suitable retroreflector optical assembly or assemblies including but not limited to those disclosed in U.S. Pat. Nos. 5,122,901, 5,227,921, 5,301,067, 5,335,111, 5,361,171, 5,486,913, 5,589,991, 5,625,501, 5,949,543, 6,141,101, 6,473,185 B2, 6,729,735 B2, 6,752,503, B2, 6,786,608131, 6,827,455 B2, 6,945,661 B2, 7,168,817 B2, 7,268,960 B2, 7,995,208 B2, 8,092,030 B2, 8,120,853 B2, 8,205,853 B2, 8,205,852 B2, 8,454,176 B2, 8,567,968 B2, 8,827,470 B2, 8,827,468 B2, 8,851,689 B2, 9,013,814 B2, 9,097,586 B2, 9,377,600 B2, 9,798,051 B2, 10,175,395 B2, 10,393,994 B2 and 10,222, 580 B2, each of which patents are incorporated by reference herein in their entireties.

Other objects of the invention will in part be apparent from the following description taken in associations with the figures.

The invention accordingly comprises an assembly, and a method of assembling an assembly, possessing the features, properties and relation of components which will be exemplified in the products hereinafter described, and the scope of the invention will be indicated in the claims.

BRIEF DESCRIPTION OF THE DRAWINGS

For a fuller understanding of the invention, reference is made to the following description taken in connection with the accompanying drawings, in which.

DETAILED DESCRIPTION OF THE PREFERRED EMBODIMENTS

As set forth in the background section above, and as will be appreciated below, the presented invention is primarily directed to a retroreflector assembly, and its mounting structures and mounting methods. It will be made clear from the below description of the construction of each assembly, that each assembly is unique and not obvious in view of existing prior art.

Throughout this specification and in the claims, reference to a mounting member can be, but is not limited to, one or more of the following or any combination thereof, pin, block, threaded body, screw, and miter joint. Further, the materials for the retroreflector assembly can be any combination or mixture of materials, including, but not limited to, glass, low expansion glass, ceramics, metals or metallics. In such an assembly, the materials may also be matched by coefficient-of-thermal-expansion (CTE) in order to further decrease optical errors induced by thermal contraction or expansion.

Throughout this specification and in the claims, reference to a mounting means is any structure, design approach or methodology or any combination thereof to retain a retroreflector to another support structure. Examples of the other support structure(s) are but are not limited to one or more or the combination thereof of the following: a mount, pin, block, housing, other device or surface.

Throughout this specification and in the claims, reference to a clamping means can be, but is not limited to, one or more of the following or any combination thereof, clamps, screws, threads, springs, and hinges. Further, the clamping means can be any combination or mixture of materials including, but not limited to, glass, low expansion glass, ceramics, metals or metallics. In such an assembly, the materials may also be matched by coefficient-of-thermal-expansion (CTE) to the housing material in order to further decrease optical errors induced by thermal contraction or expansion.

Figure 1:
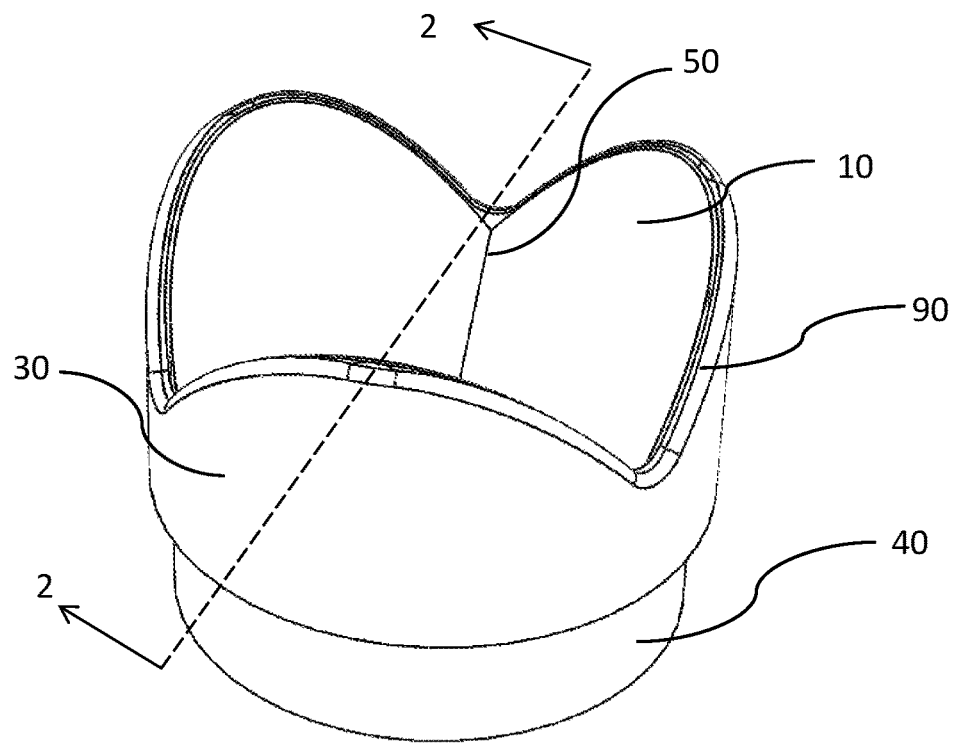
FIG. 1 is a perspective view of a retroreflector assembly, made in accordance with at least the first embodiment of the present retroreflector assembly invention.
Figure 2:
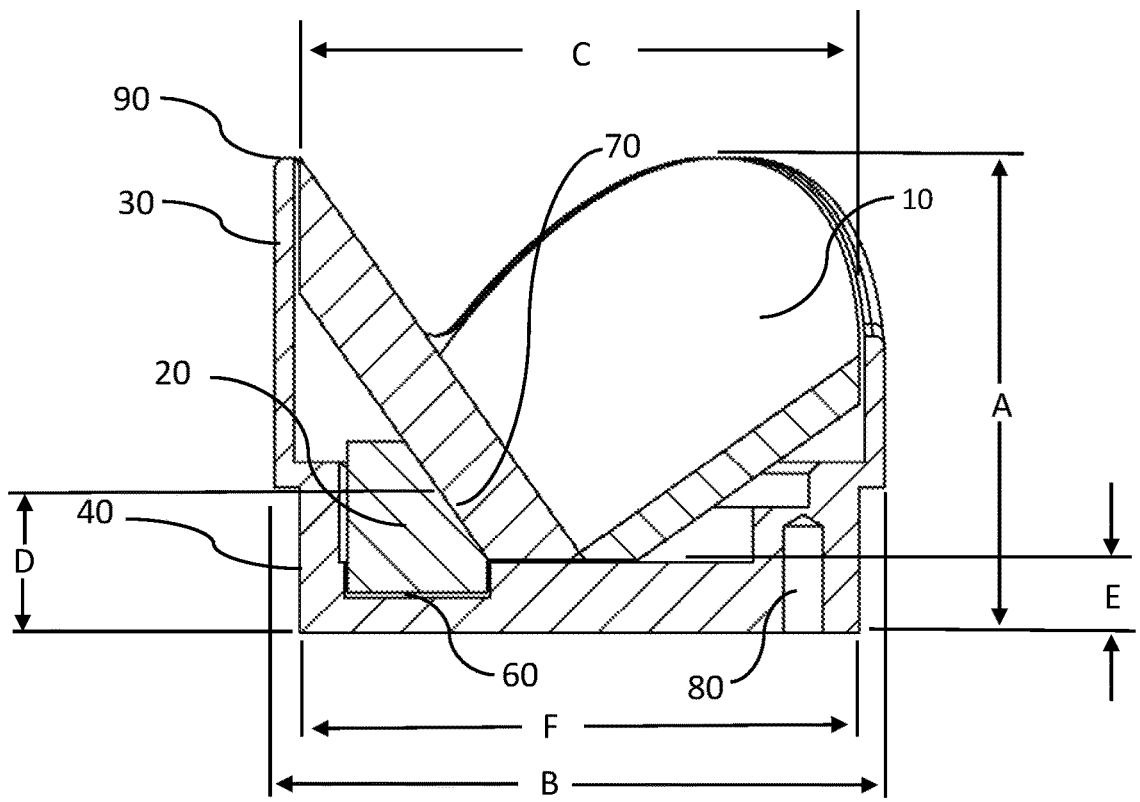
FIG. 2 is a is a cross-sectional view of the retroreflector assembly of FIG. 1, taken along line 2-2 of FIG. 1.
Figure 3:
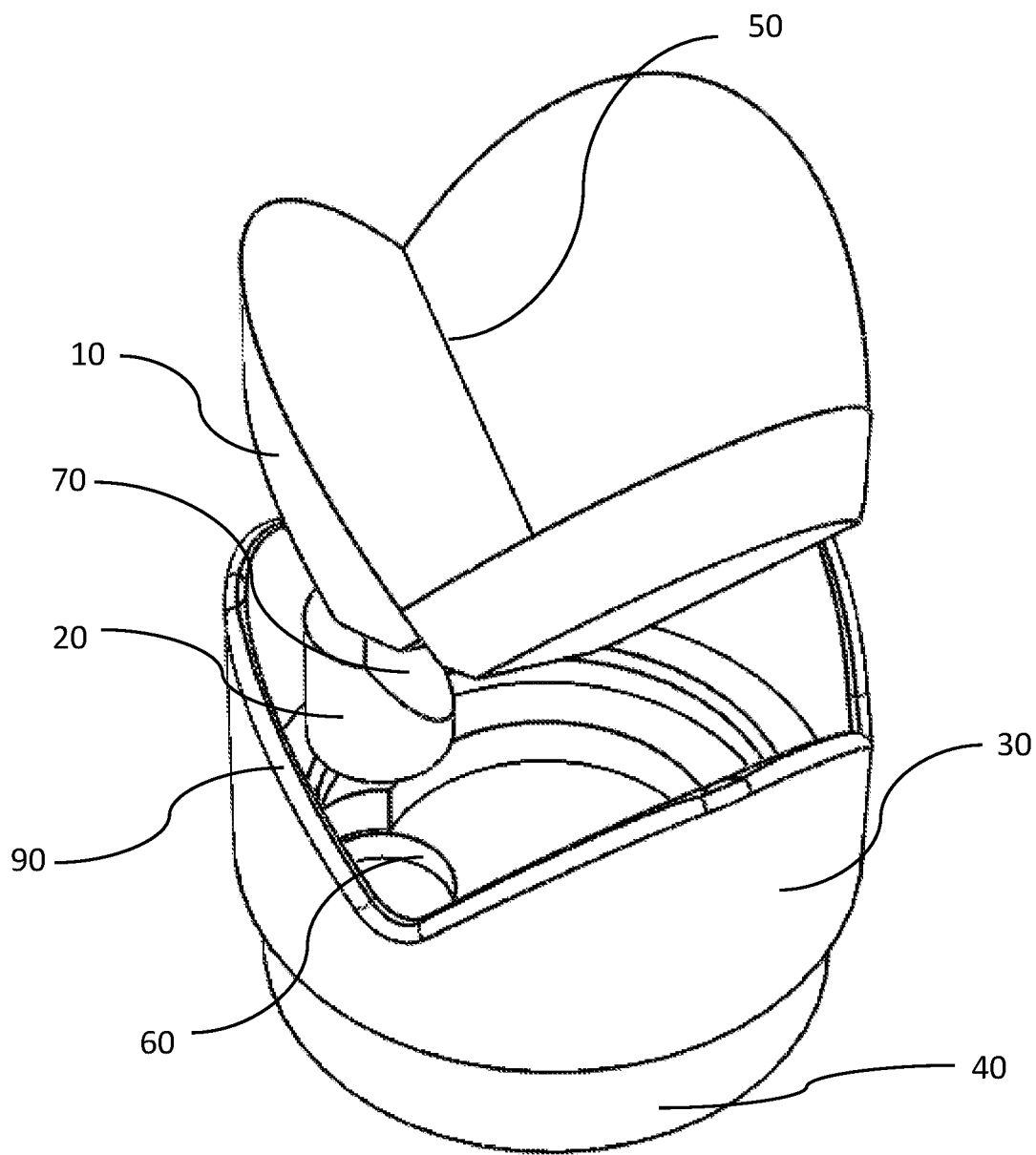
FIG. 3 is a is an exploded perspective view of the retroreflector assembly of FIGS. 1-2.

The first preferred embodiment of the retroreflector assembly is depicted in FIGS. 1-3, showing the retroreflector (10) having a housing (30) with optional rounded edges (90) for receipt of the retroreflector therein, with an optional inset (40) in the housing. In this first embodiment, the retroreflector has three optically reflective plates at right angle interfaces (50). The retroreflector assembly has a first mounting element (20) having a housing interface (60) with the housing (30) and an retroreflector interface (70) with the retroreflector (10). In this first embodiment, housing interface (60) at which mounting element (20) is secured to housing (30) is preferably through use of various mechanical or chemical means and is typically screwless. For example, an adhesive can be used on housing interface (60) to secure mounting element (20) to housing (30). The inset (40) is just one example of having multiple external diameter sections for housing (30), in this case two, namely the main external diameter shown at dimension "B" of FIG. 2 (or respectively in "BB" of FIG. 14), and inset (40)'s external diameter, shown in FIG. 2 at dimension "F" of FIG. 2 (or respectively in "FF" of FIG. 14). Other multiple diameter sections may be utilized for various purposes, but generally such geometries would be designed to engage with a specific mounting to another device or surface.

Also, in this first embodiment, the retroreflector assembly can be mounted to another device by utilizing a screw mounting (80). The inset (40) of the housing can be highly beneficial in placing two mounted retroreflectors within close vicinity to each other. With an inset in the housing, a narrow retaining method can be used such as various clamping means, while still not reaching beyond the outer diameter of the housing. Therefore, two such retroreflector assemblies can substantially abut each other (i.e., be side-by-side), thereby minimizing linear spacing between the two assemblies. Such a construction is highly advantageous in some applications such as but not limited to metrology or wavemeters. Such a construction using inset (40) at the bottom of the housing is also advantageous for other applications, however, requires an even more novel compact design in the mounting means since the volume near the bottom of the housing is further constricted in at least a radial direction due to the inset design. The limitation in spacing in this region due to an inset requires at least a further compactness of the mounting element(s).

Figure 14:
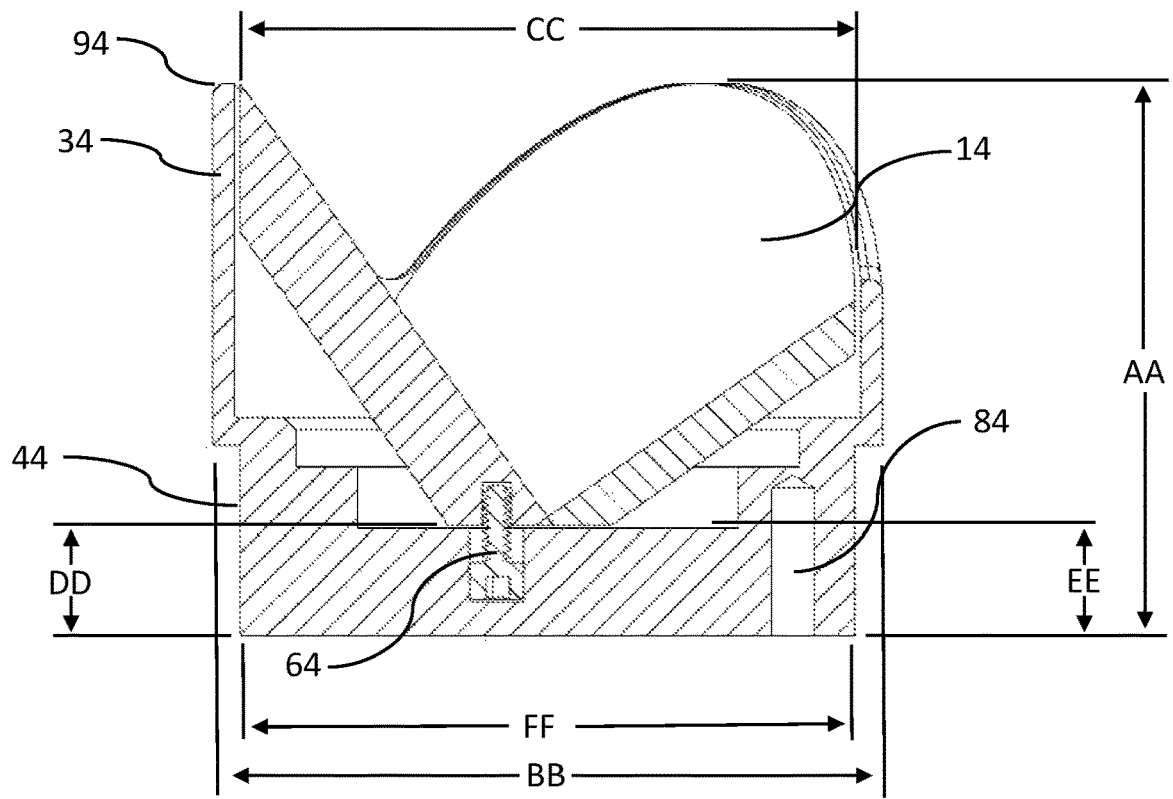
FIG. 14 is a is a cross-sectional view of the retroreflector assembly of FIG. 13, taken along line 14-14 of FIG. 13.

The geometry and structure of the retroreflector assembly is inherently compact such that the vertical height of the retroreflector assembly (FIG. 2—Dimension "A" and FIG. 14—dimension "AA") is smaller than the clear aperture distance of the retroreflector (FIG. 2—Dimension "C" and FIG. 14—dimension "CC"). Such a compact and stable design is highly advantageous for tight spacing and low weight requirements in specific applications. In prior art references such as U.S. Pat. No. 5,335,111, Bleier fails to teach a vertically compact assembly for a retroreflector, wherein the support structure of the retroreflector combines to a large vertical height of the assembly and the retroreflector is retained to the support structure at interfaces located far from the bottom of the support structure. Also, in such other prior art, any mounting means is at a much higher vertical position than the present invention. For any effects or concerns to the design integrity and performance, such as but not limited to thermal, vibration, shock, and stability, having a shorter height of the assembly (FIG. 2—dimension "A" and FIG. 14—dimension "AA") and the mounting element (20)'s retroreflector interface (70) with the retroreflector at a lower vertical mounting position (FIG. 2—dimension "D" and FIG. 14—dimension "DD") is highly advantageous. Any forces or moments from the base of the housing are relative to the center of gravity or mass of the overall assembly, which are now minimized in relation to the vertical height and the dimension "E" (or dimension "EE" of FIG. 14) of the base of retroreflector to base of the housing (30). In a preferred embodiment, given a range of clear aperture distance between 0.5 to 5.0 inches (dimension "C" and "CC"), dimensions "D" and "DD" may range in length between 0.1 and 0.8 inches, while dimensions E and EE may range in length between 0.1 and 0.3 inches. Furthermore, having the mounting element(s) (20) and retroreflector interface (70) closer to the bottom of the housing or closer to the center of gravity/mass are also beneficial to performance and stability. In this first embodiment having a substantial pin-like structure as the mounting element is also very robust and secure in terms of retaining the retroreflector compared to prior art, where typically the retroreflector and the housing are typically directly connected through limited contact means. There is significant value in having at least one mounting element and interfaces as an intermediate member as compared to a direct connection between the retroreflector and other support structure, whereas the mounting element(s) is the intermediary between the retroreflector and housing, to provide some allowance for thermal or mechanical effects.

Figure 4:
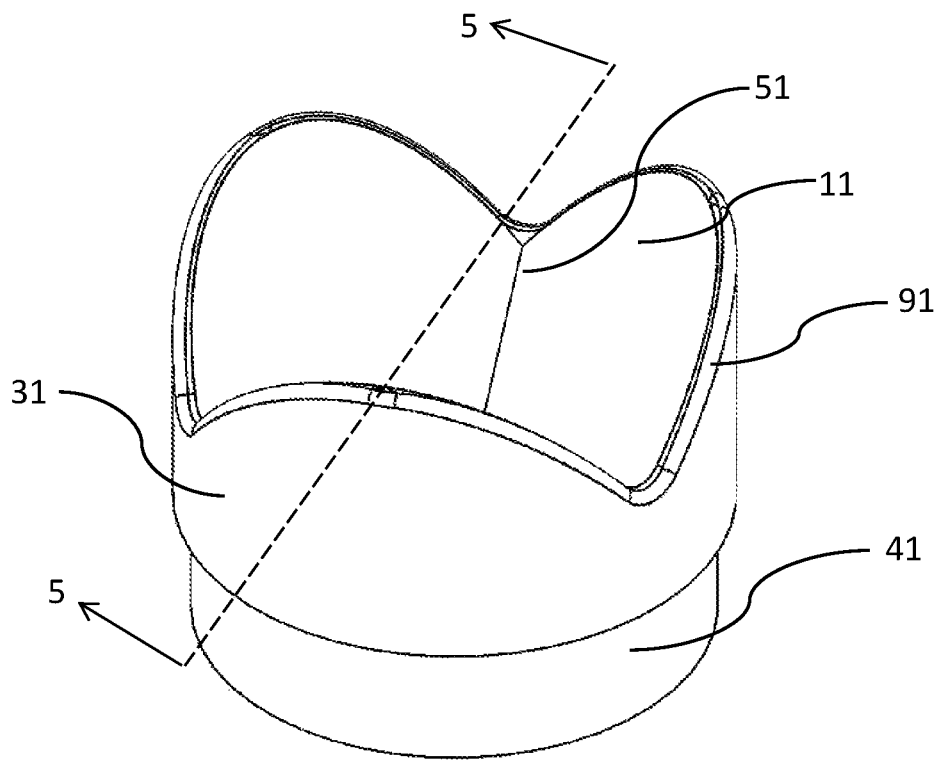
FIG. 4 is a perspective view of a retroreflector assembly, made in accordance with at least the second embodiment of the present retroreflector assembly invention.
Figure 5:
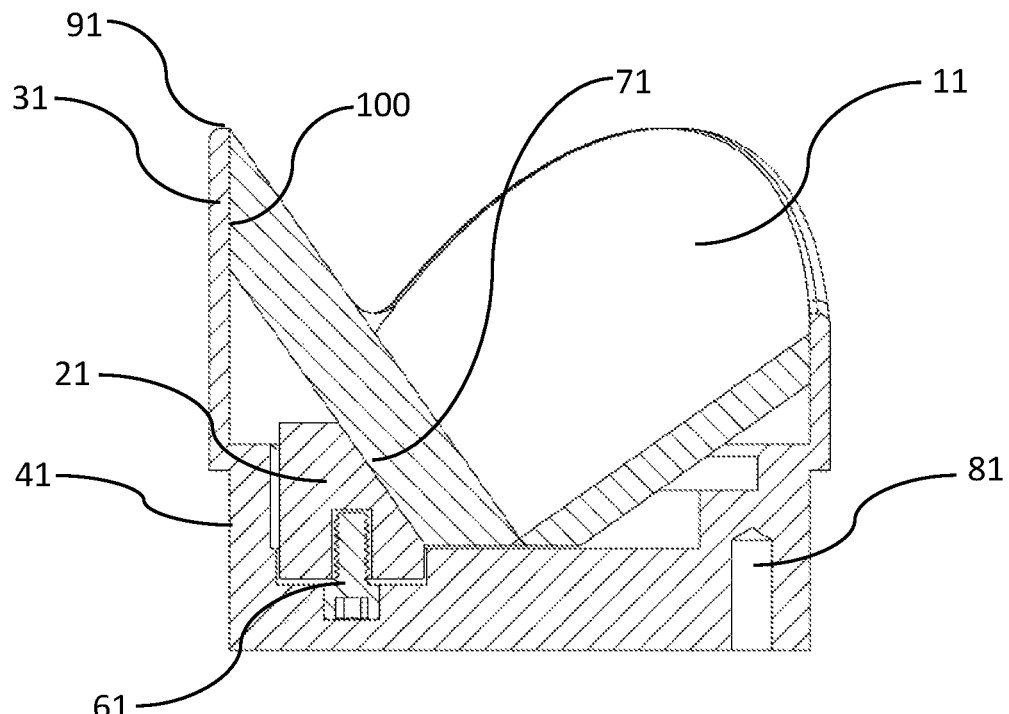
FIG. 5 is a is a cross-sectional view of the retroreflector assembly of FIG. 4, taken along line 5-5 of FIG. 4.
Figure 6:
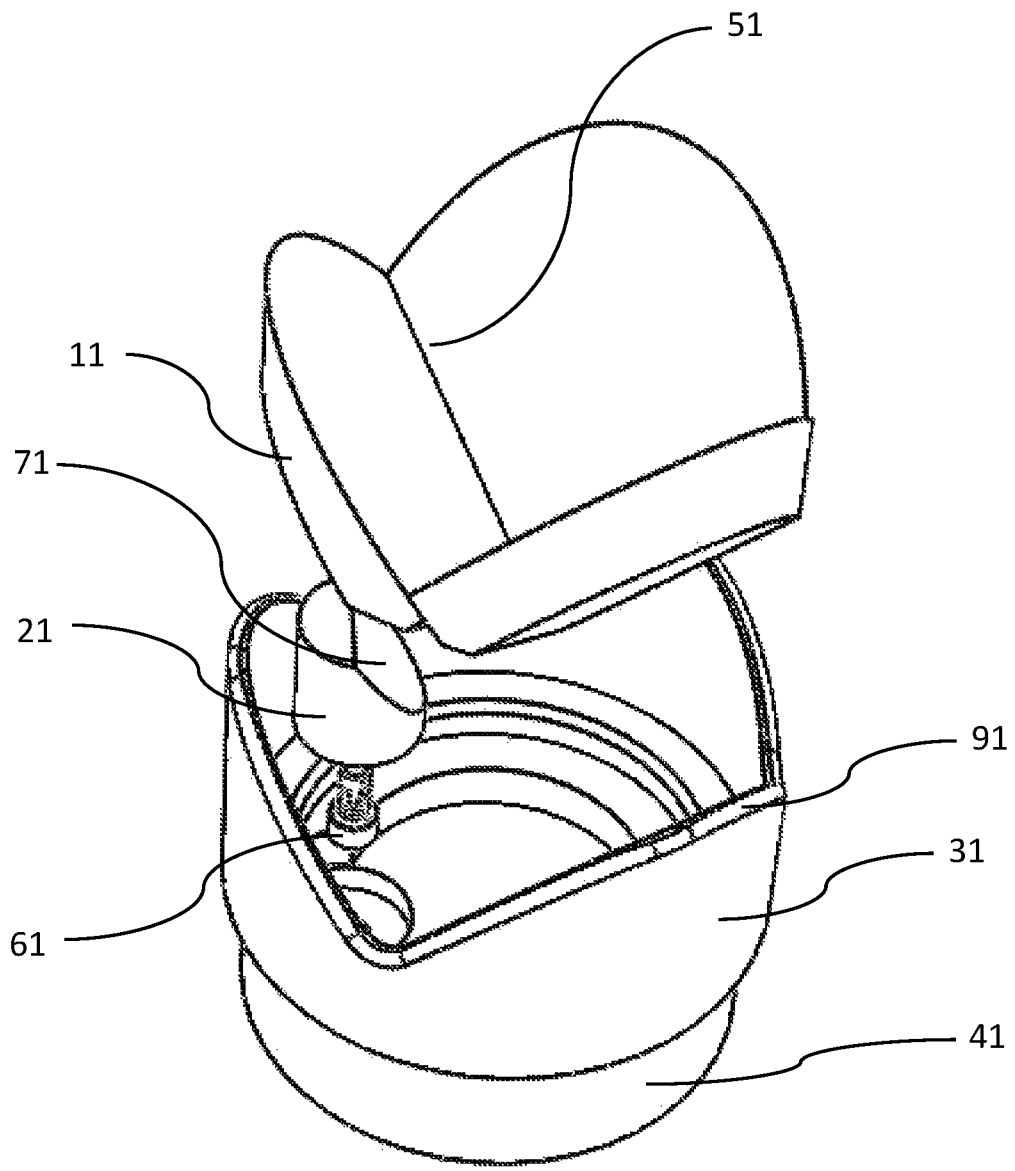
FIG. 6 is a is an exploded perspective view of the retroreflector assembly of FIGS. 4-5.

The second preferred embodiment of the retroreflector assembly is depicted in FIGS. 4-6, showing the retroreflector (11) having a housing (31) with optional rounded edges (91) for receipt of the retroreflector therein, with an optional inset (41) in the housing. In this second embodiment, the retroreflector has three optically reflective plates at right angle interfaces (51). The retroreflector assembly has a first mounting element (21) having a captured screw-based housing interface (61) with the housing and a retroreflector interface (71) with the retroreflector. In this second embodiment, the retroreflector can be mounted to another device by utilizing a screw mounting (81). In this embodiment, an example is shown with an additional mounting interface (100) of the retroreflector directly to the housing (31). Throughout all embodiments, this additional interface option may be utilized such that the retroreflector is in partial contact in a tangential manner to the inner side walls of the housing, whereby this may provide additional support to the retroreflector within the housing. At the least, such a design may be in direct contact or have a basic tolerance between the retroreflector and the side walls of the housing.

For all of the retroreflector assembly embodiments shown in all of the figures, the retroreflector assemblies may be rotationally symmetric from an external housing perspective, while the internal elements of the assemblies will not usually have symmetry.

Figure 7:
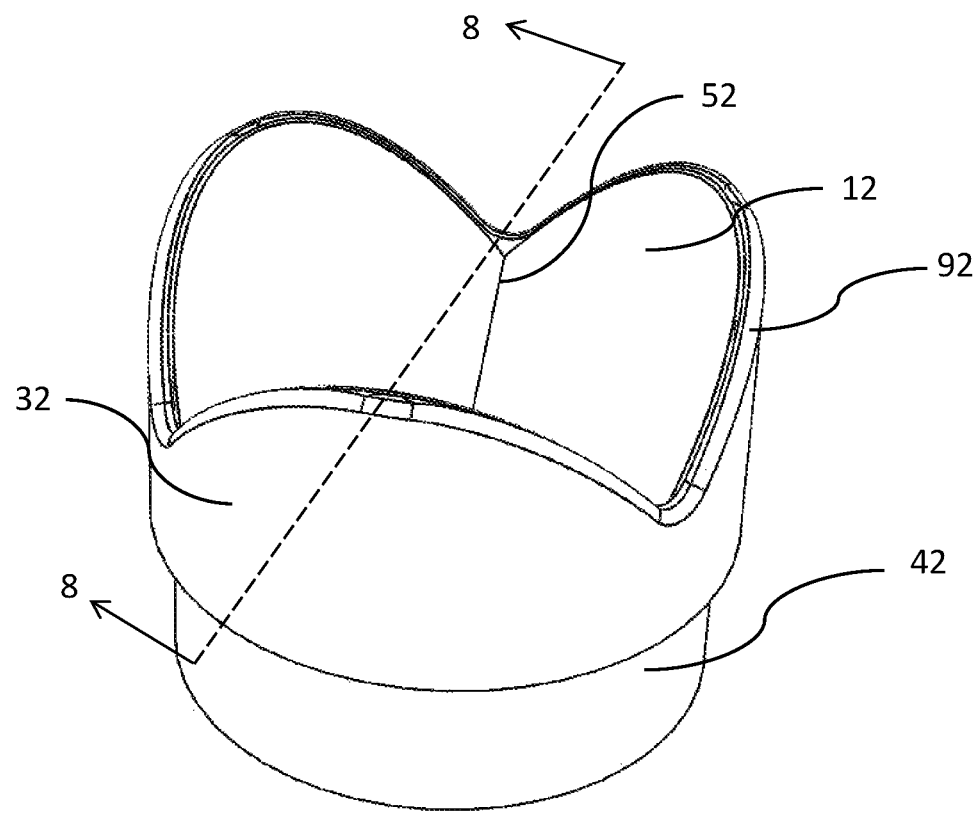
FIG. 7 is a perspective view of a retroreflector assembly, made in accordance with at least the third embodiment of the present retroreflector assembly invention.
Figure 8:
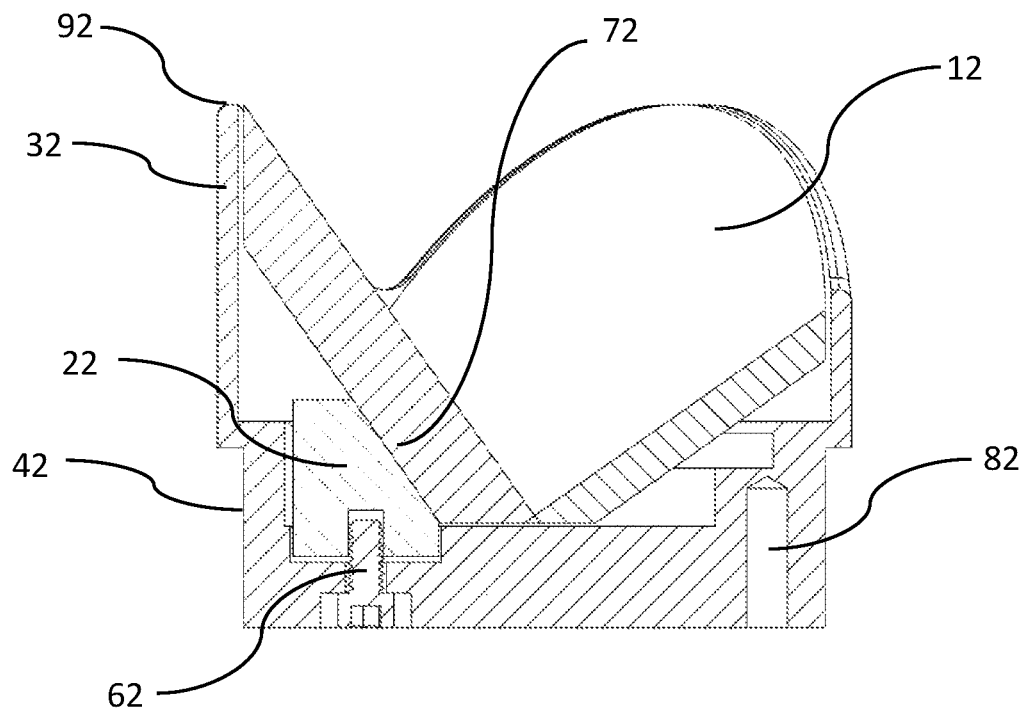
FIG. 8 is a is a cross-sectional view of the retroreflector assembly of FIG. 7, taken along line 8-8 of FIG. 7.
Figure 9:
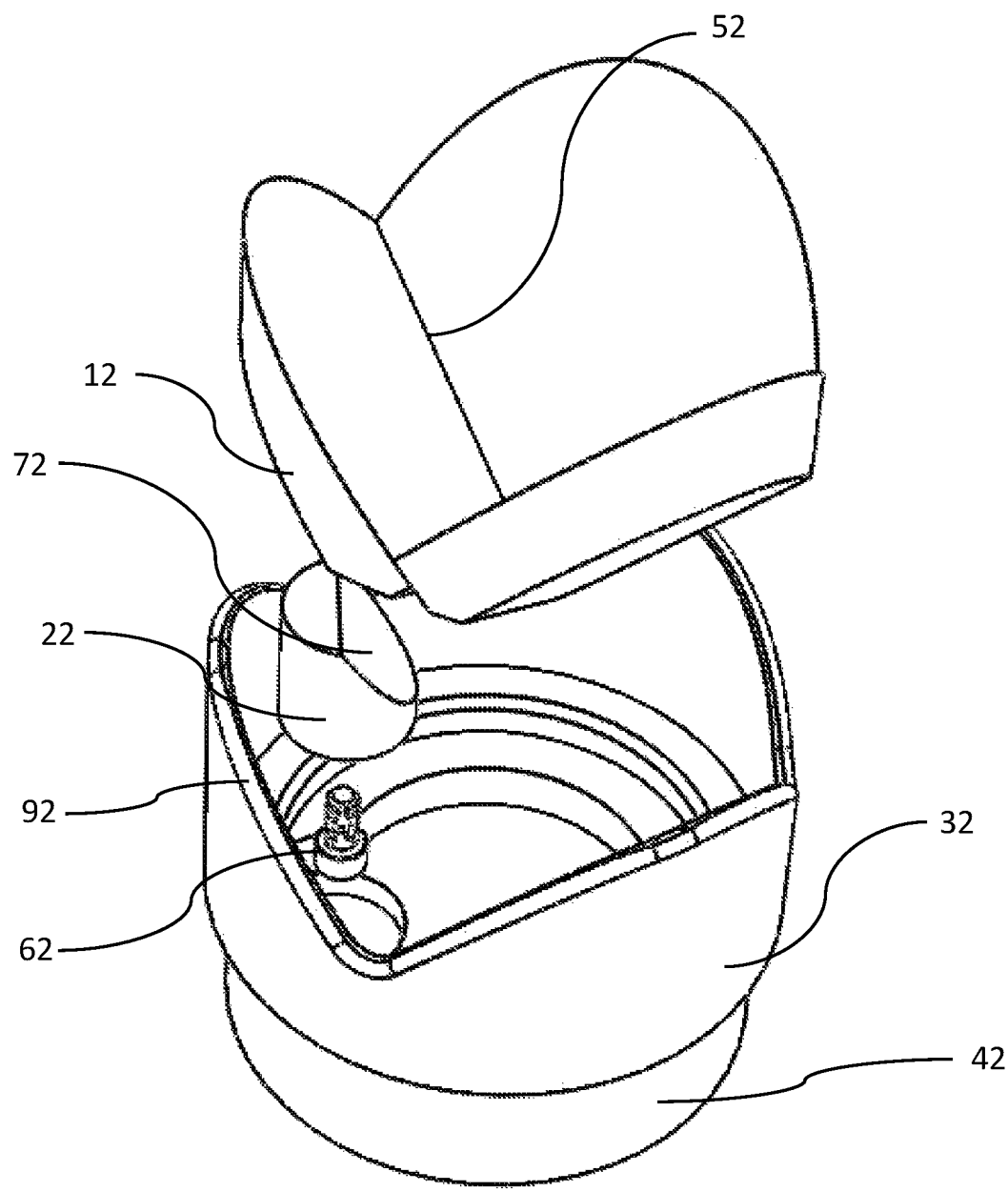
FIG. 9 is a is an exploded perspective view of the retroreflector assembly of FIGS. 7-8.

The third preferred embodiment of the retroreflector assembly is depicted in FIGS. 7-9, showing the retroreflector (12) having a housing (32) with optional rounded edges (92) for receipt of the retroreflector therein, with an optional inset (42) in the housing. In this third embodiment, the retroflector has three optically reflective plates at right angle interfaces (52). The retroreflector assembly has a first mounting element (22) having an accessible screw-based housing interface (62) with the housing (32) and a retroreflector interface (72) with the retroreflector (12). Here, the screw connecting mounting element (22) with housing (32) is accessible through and outside opening in the housing. In this third embodiment, the retroreflector can be mounted to another device by utilizing a screw mounting (82).

Figure 10:
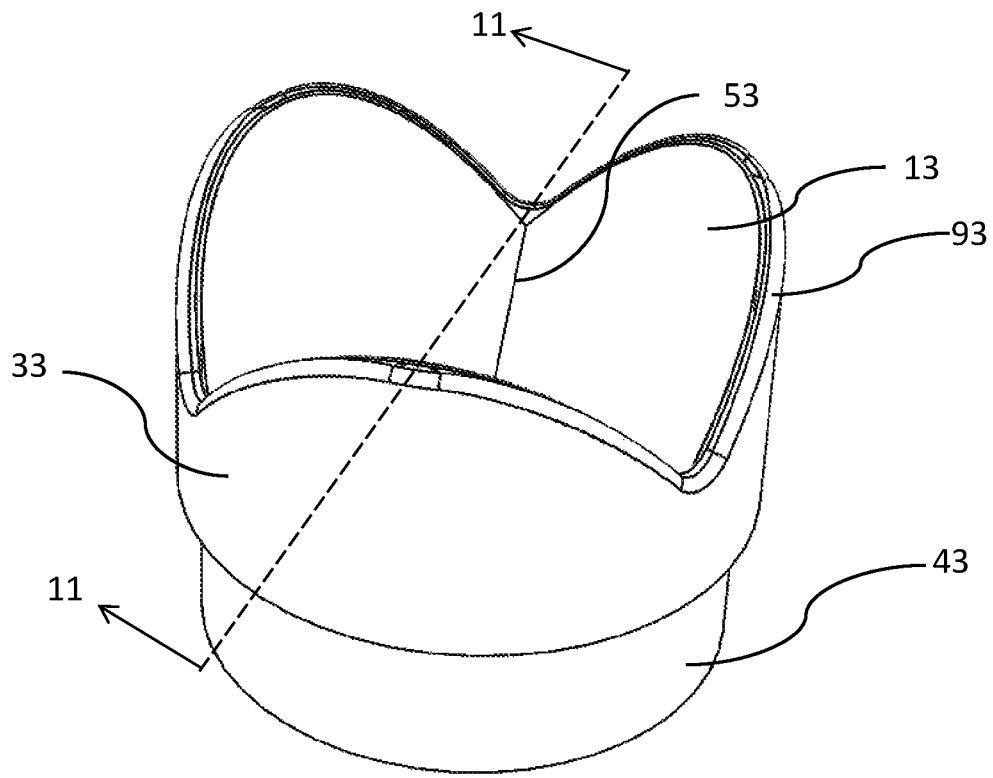
FIG. 10 is a perspective view of a retroreflector assembly, made in accordance with at least the fourth embodiment of the present retroreflector assembly invention.
Figure 11:
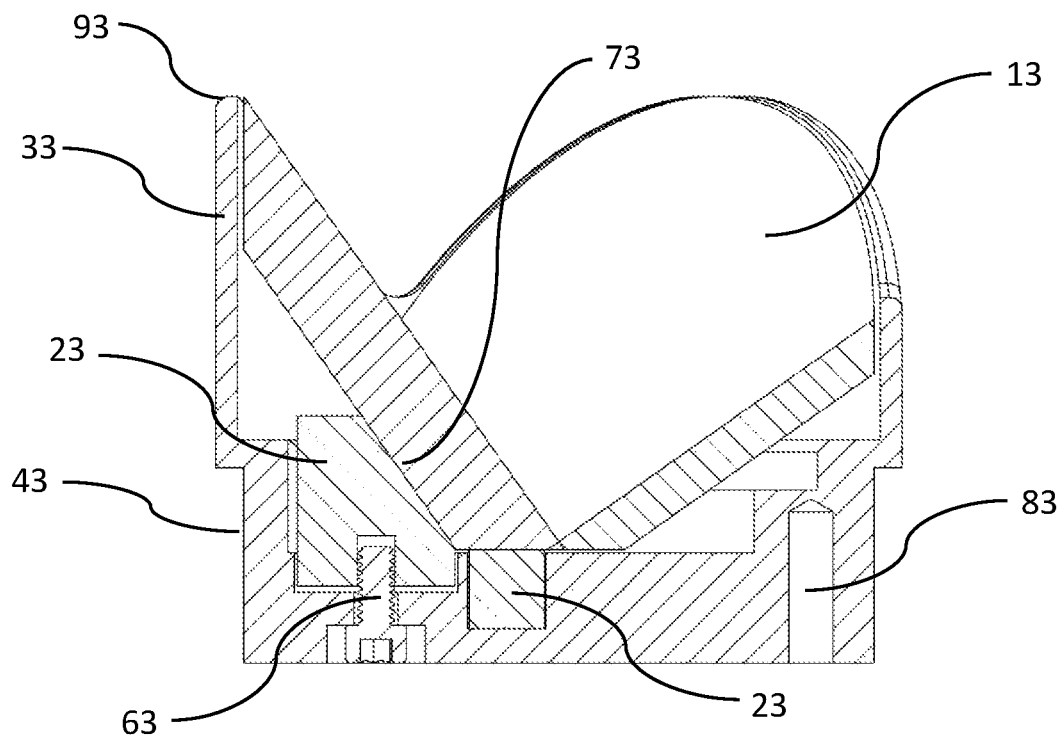
FIG. 11 is a is a cross-sectional view of the retroreflector assembly of FIG. 10, taken along line 11-11 of FIG. 10.
Figure 12:
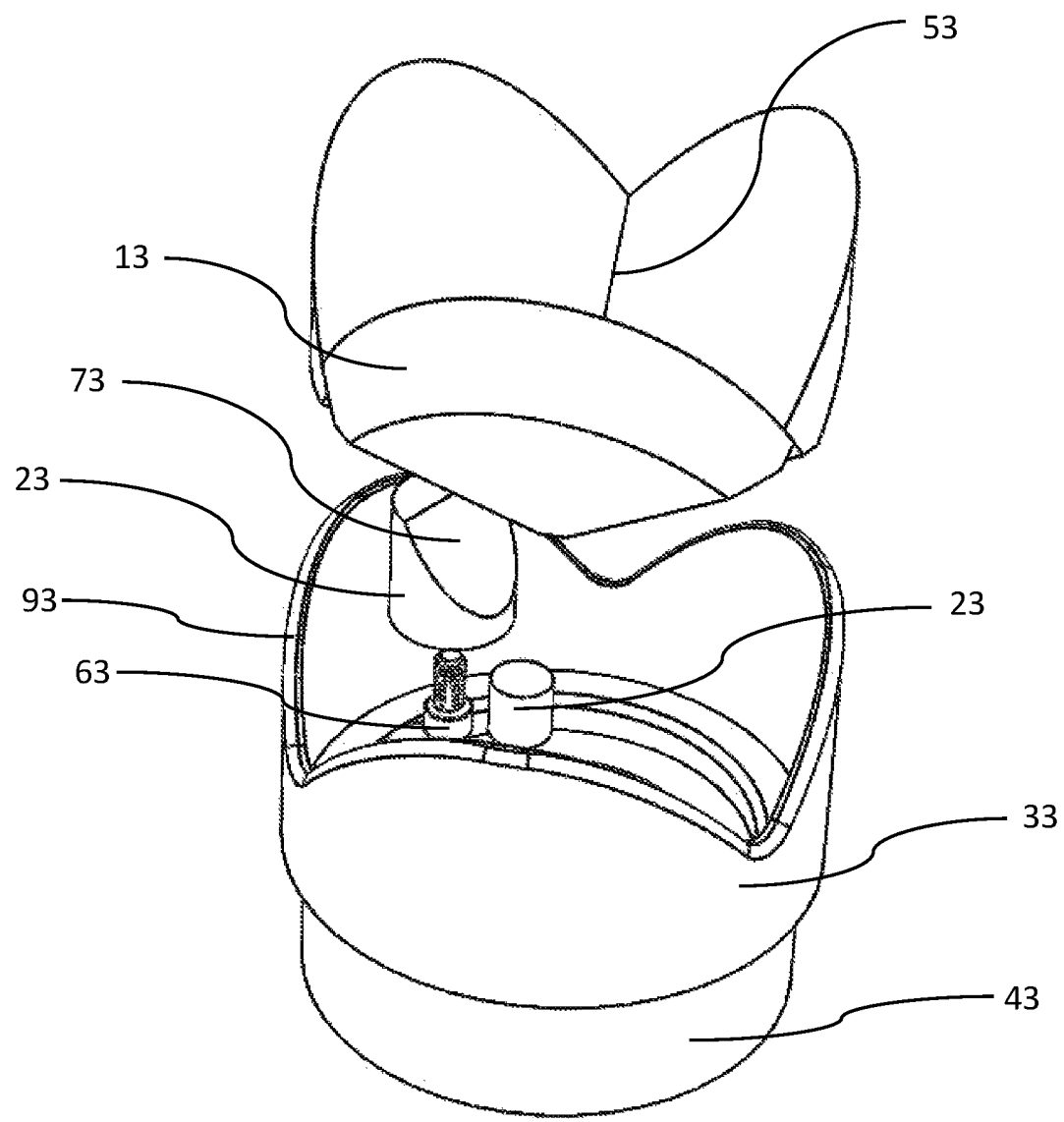
FIG. 12 is a is an exploded perspective view of the retroreflector assembly of FIGS. 10-11.

The fourth preferred embodiment of the retroreflector assembly is depicted in FIGS. 10-12, showing the retroreflector (13) having a housing (33) with optional rounded edges (93) for receipt of the retroreflector therein, with an optional inset (43) in the housing. In this fourth embodiment, the retroflector has three optically reflective plates at right angle interfaces (53). The retroreflector assembly has a first mounting element (23) having a screw-based interface with the housing (63) and a second mounting element (23) similar to that of the third embodiment, and an interface with the retroreflector (73). Multiple mounting elements can be added to further reinforce the retroreflector to the housing, wherein the mounting elements can also be of different types or methods to provide a combination of mounting means. Contrasting against the first through third embodiment, the interface of the housing with the mounting is attached closer to the apex of the retroreflector, showing the retroreflector interface may be located at any position along one of the plates, with specific locations having different advantages. In this fourth embodiment, the retroreflector can be mounted to another device by utilizing a screw mounting (83).

Figure 13:
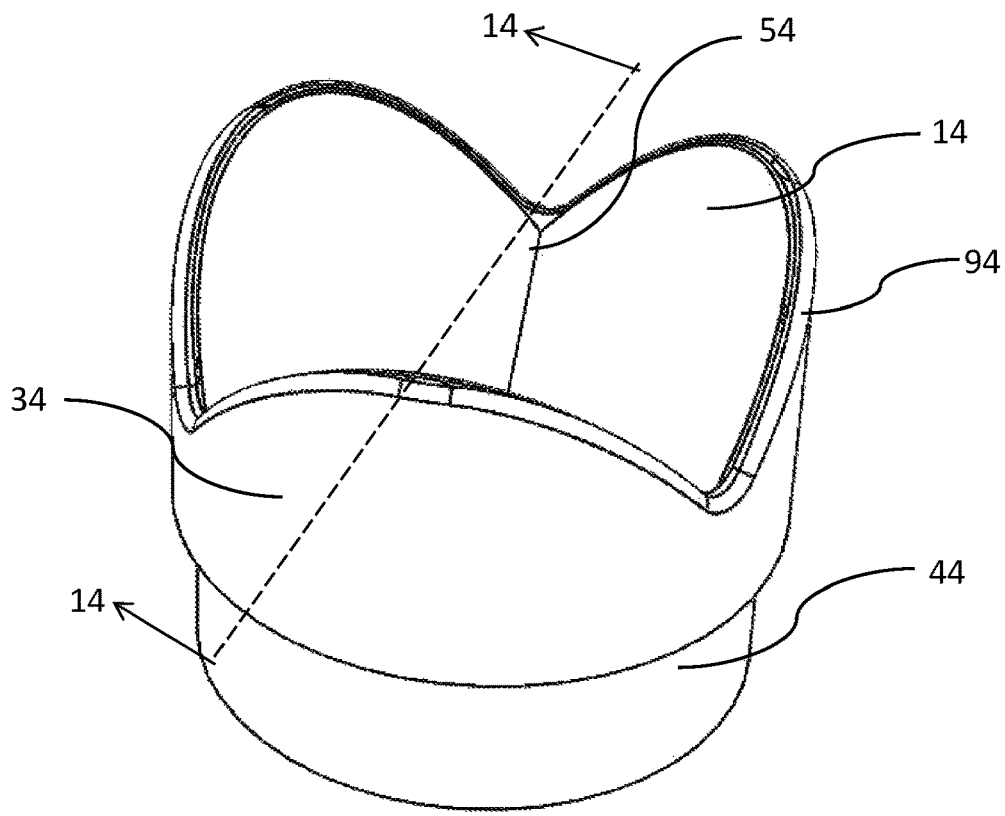
FIG. 13 is a perspective view of a retroreflector assembly, made in accordance with at least the fifth embodiment of the present retroreflector assembly invention.
Figure 15:
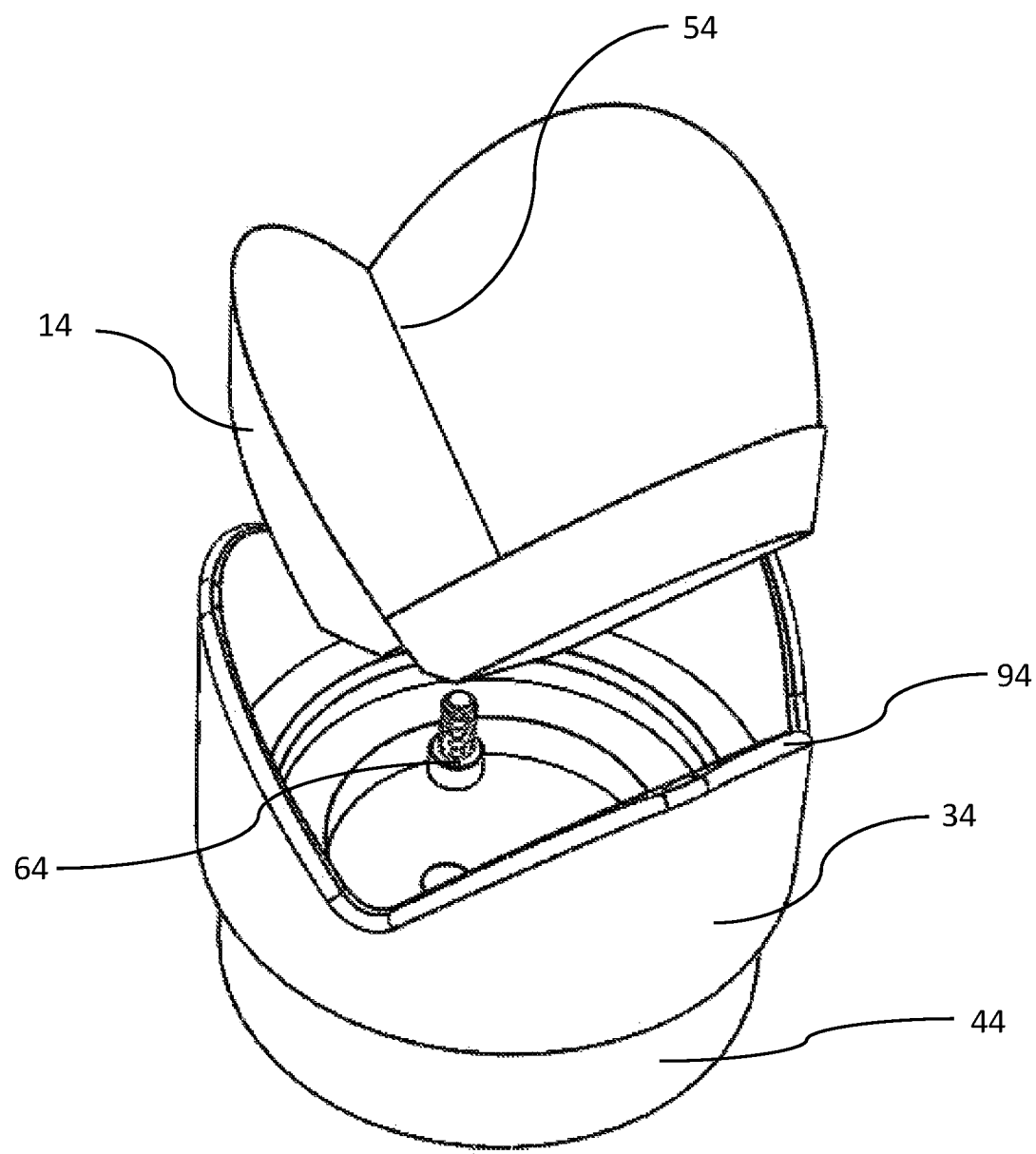
FIG. 15 is a is an exploded perspective view of the retroreflector assembly of FIGS. 13-14.

The fifth preferred embodiment of the retroreflector assembly is depicted in FIGS. 13-15, showing the retroreflector (14) having a housing (34) with optional rounded edges (94) for receipt of the retroreflector therein, with an optional ring (44) attached or intrinsically part of the housing. In this fifth embodiment, the retroflector has three optically reflective plates at right angle interfaces (54). The retroreflector assembly has a first mounting element (24) having an interface with the housing (64) and an interface with the retroreflector (74). This embodiment is uniquely novel in the mounting means as the mounting element is a screw captured within the housing and directly interfaced with at least one of the plates of the retroreflector. Such a design is unique on its own merits outside of the restriction on the aspect ratio of the retroreflector assembly, as its quite difficult to achieve such a design to screw mount directly into a retroreflector plate from a complete assembly standpoint without an effect on the optical performance. The screw element(s) can be captured by various constructions, such as but not limited to mechanical, chemical, joining, material or structural methods. Furthermore, this embodiment has the mounting element near the horizontal center of the assembly, and very low to the base of the housing which is a very stable location option.

Figure 16:
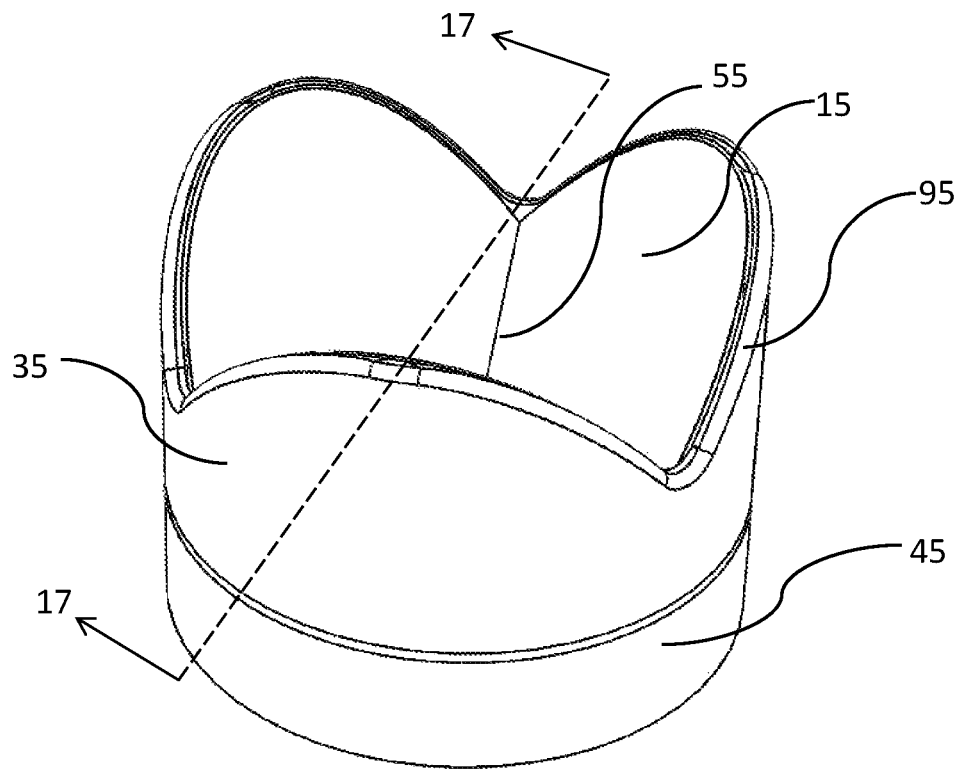
FIG. 16 is a perspective view of a retroreflector assembly, made in accordance with at least the sixth embodiment of the present retroreflector assembly invention.
Figure 17:
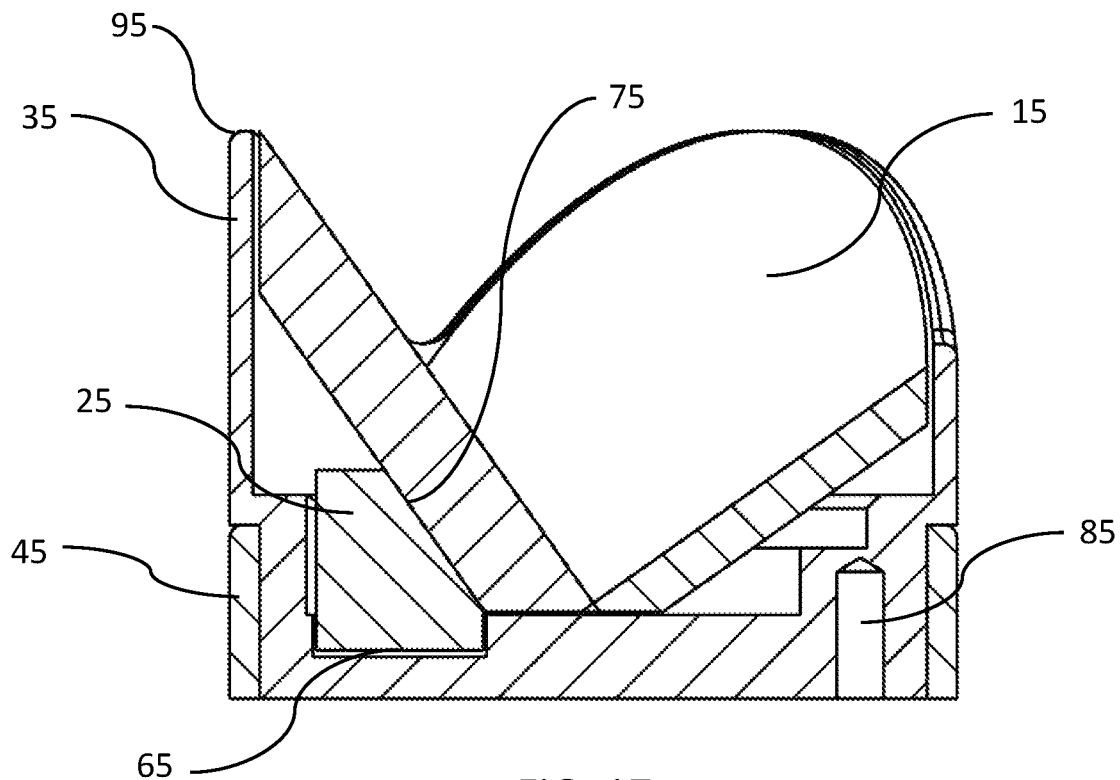
FIG. 17 is a is a cross-sectional view of the retroreflector assembly of FIG. 16, taken along line 17-17 of FIG. 16.
Figure 18:
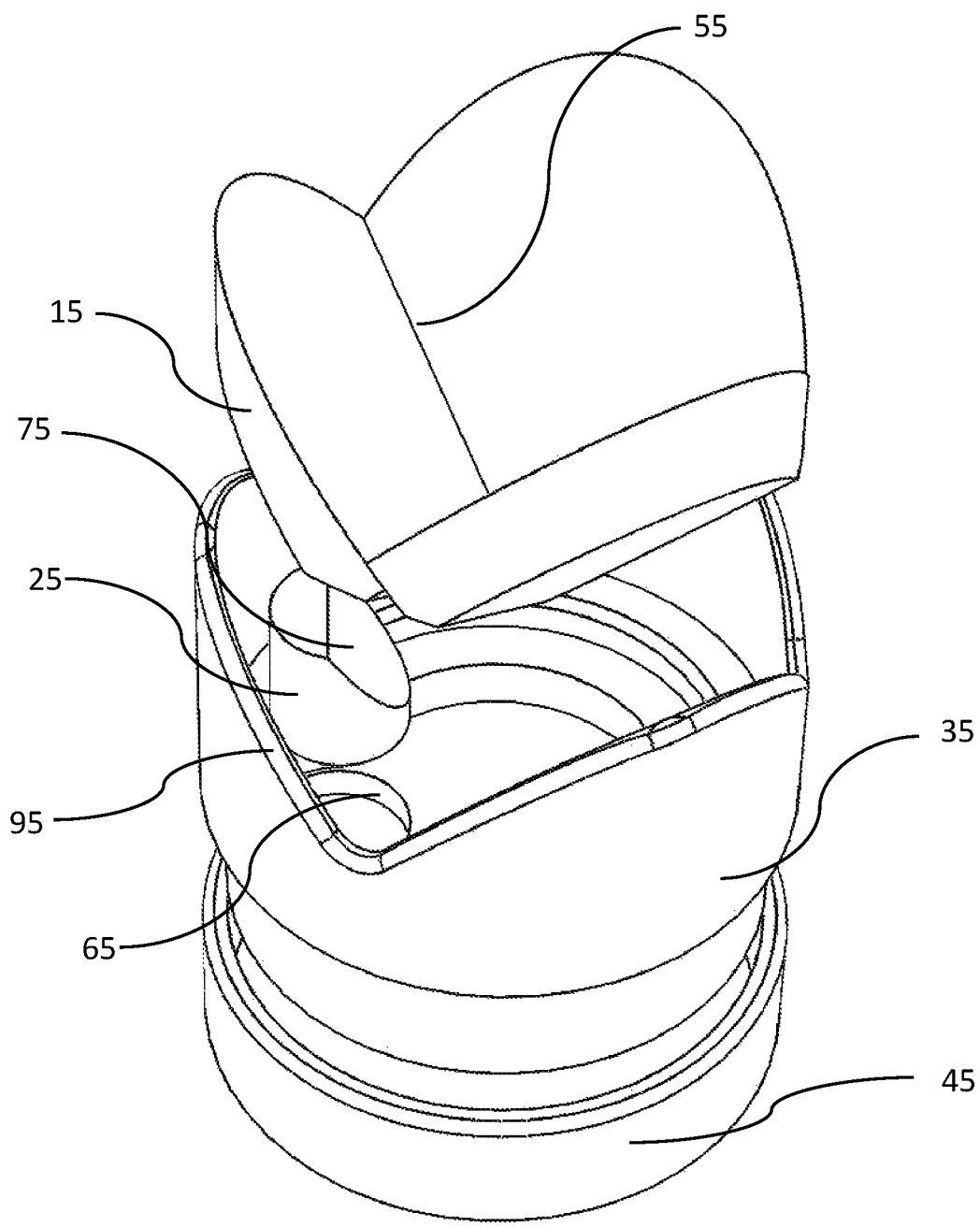
FIG. 18 is a is an exploded perspective view of the retroreflector assembly of FIGS. 16-17.

The sixth preferred embodiment of the retroreflector assembly is depicted in FIGS. 16-18, showing the retroreflector (15) having another design of the housing (35) with optional rounded edges (95) for receipt of the retroreflector therein. In this sixth embodiment, the retroflector has three optically reflective plates at right angle interfaces (55). The retroreflector assembly has a first mounting element (25) having an interface with the housing (65) and an interface with the retroreflector (74). The housing has an optional ring (45) which can be a separate part or intrinsically combined with the housing (35), to provide a continuous external diameter or to interface with another device or surface.

Figure 19:
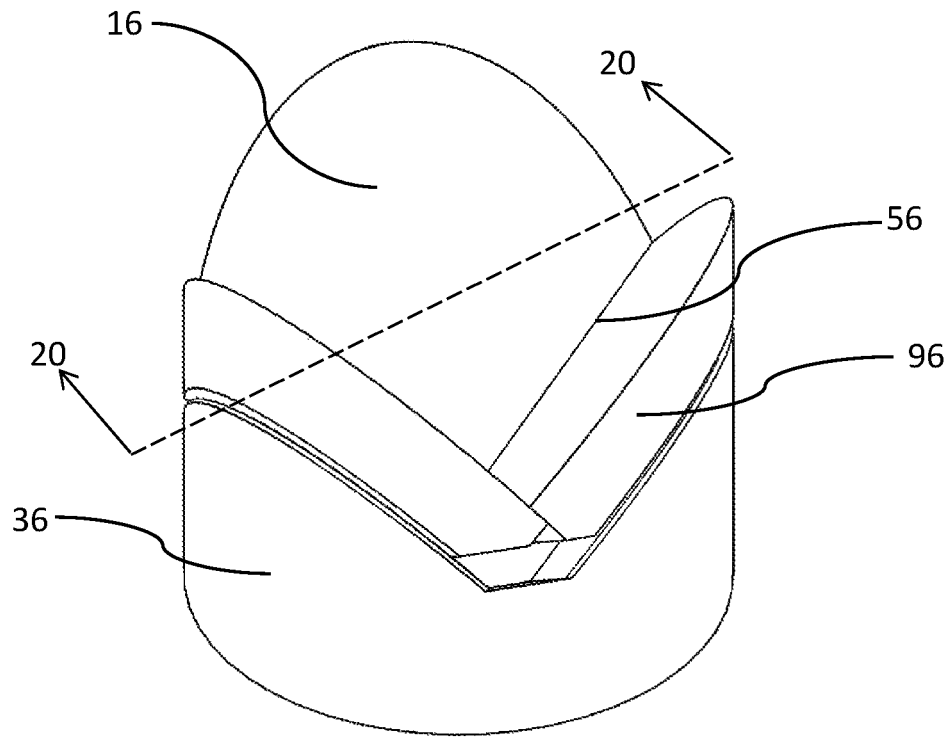
FIG. 19 is a perspective view of a retroreflector assembly, made in accordance with at least the seventh embodiment of the present retroreflector assembly invention.
Figure 20:
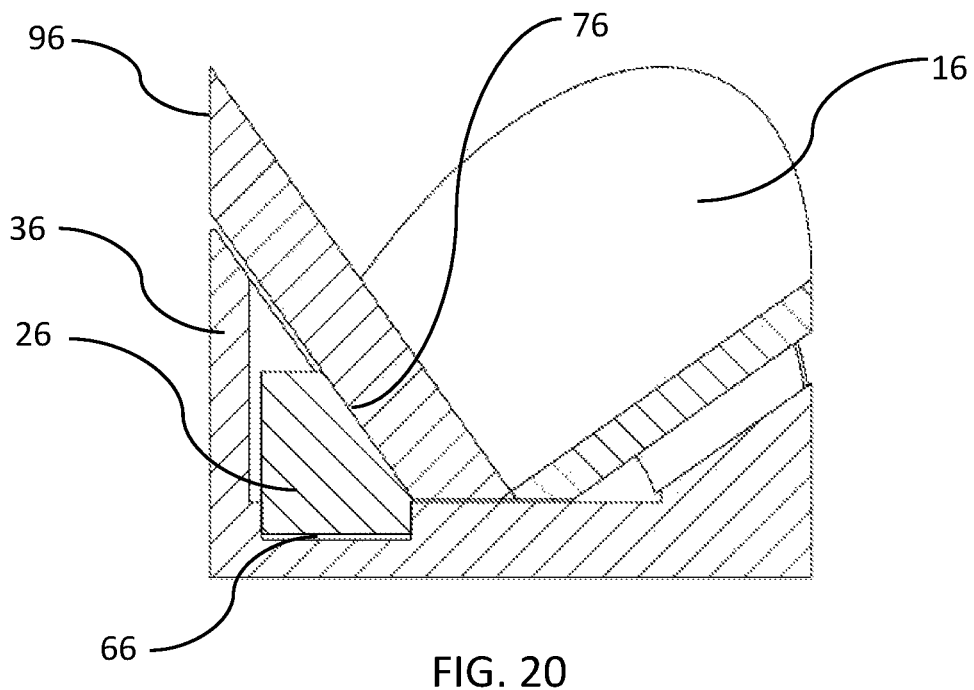
FIG. 20 is a is a cross-sectional view of the retroreflector assembly of FIG. 19, taken along line 20-20 of FIG. 19.
Figure 21:
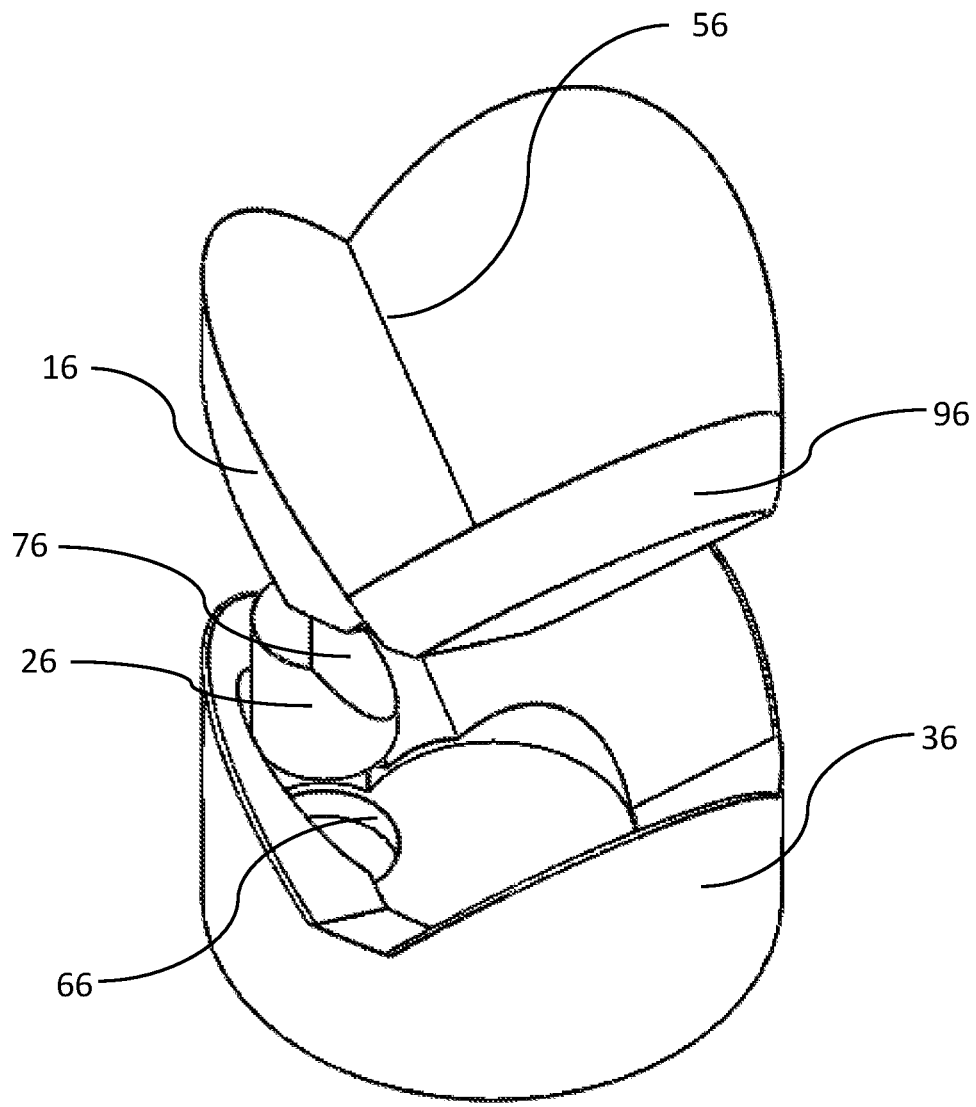
FIG. 21 is a is an exploded perspective view of the retroreflector assembly of FIGS. 19-20.

The seventh preferred embodiment of the retroreflector assembly is depicted in FIGS. 19-21, showing the retroreflector (16) having another design of the housing (36) for receipt of the retroreflector therein, having a single piece construction ending at the outer surface of the backs of the plates of the retroreflector (96) such that the edges of the retroreflector plates are externally exposed. In this seventh embodiment, the retroflector has three optically reflective plates at right angle interfaces (56). The retroreflector assembly has a first mounting element (26) having an interface with the housing (66) and an interface with the retroreflector (76).

Figure 22:
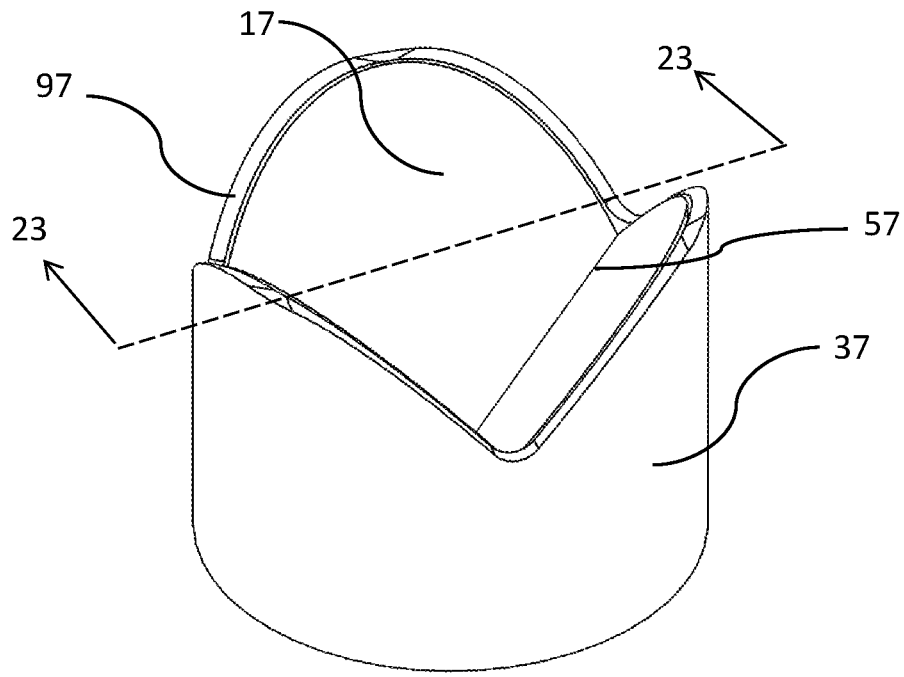
FIG. 22 is a perspective view of a retroreflector assembly, made in accordance with at least the eighth embodiment of the present retroreflector assembly invention.
Figure 23:
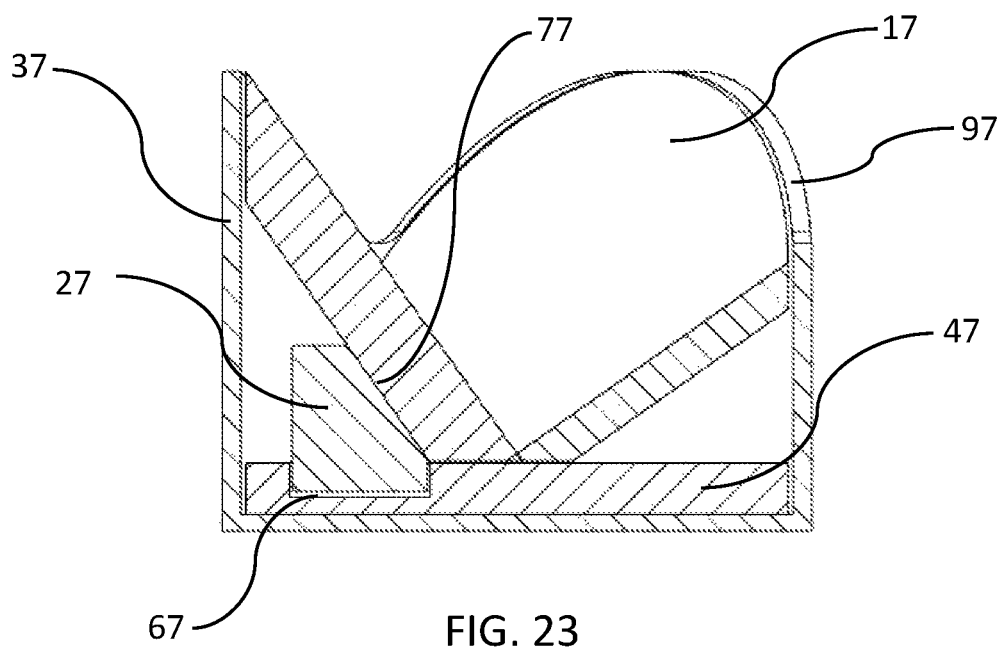
FIG. 23 is a is a cross-sectional view of the retroreflector assembly of FIG. 22, taken along line 23-23 of FIG. 22.
Figure 24:
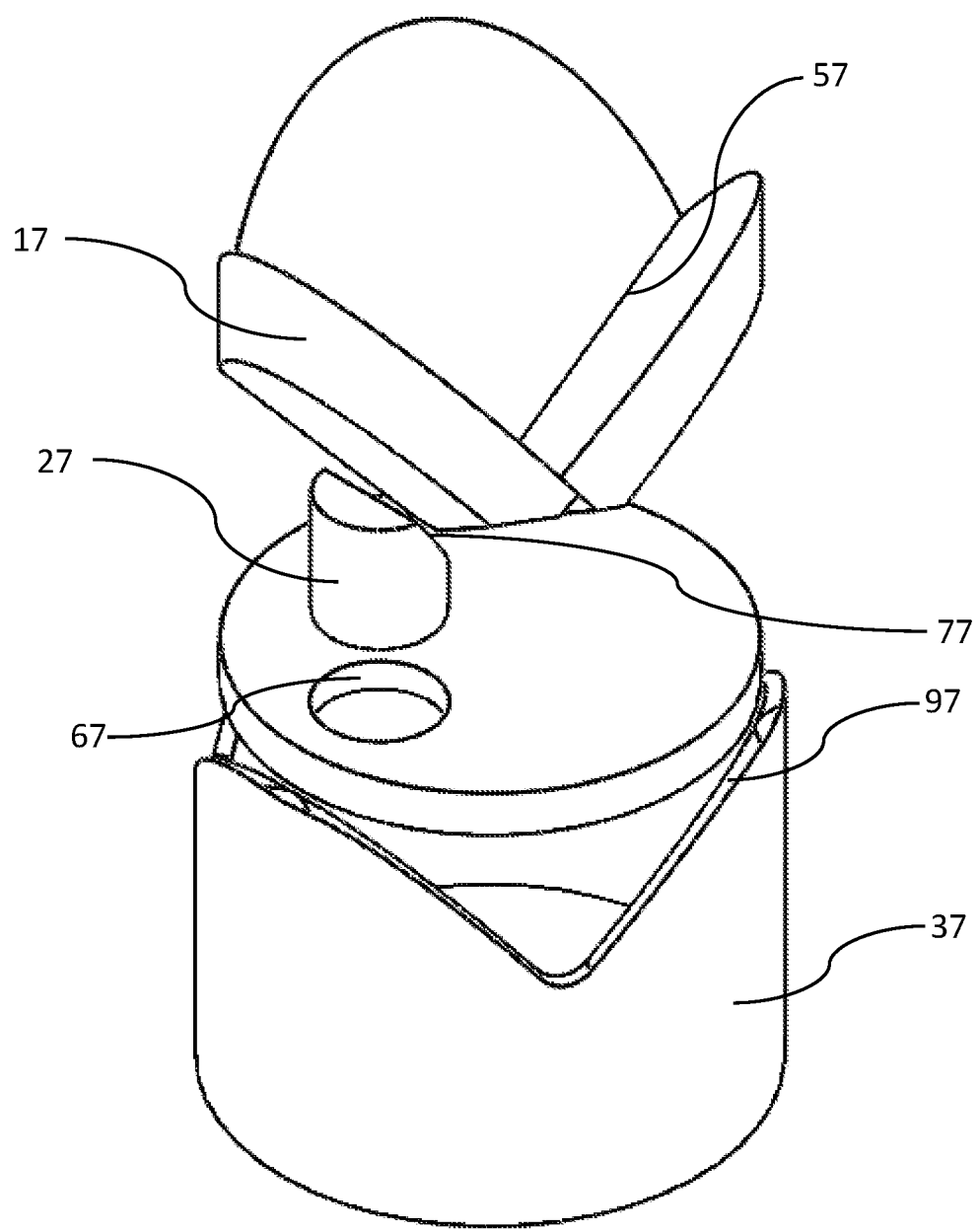
FIG. 24 is a is an exploded perspective view of the retroreflector assembly of FIGS. 22-23.

The eighth preferred embodiment of the retroreflector assembly is depicted in FIGS. 22-24, showing the retroreflector (17) having another design of the housing (37) for receipt of the retroreflector therein, having a single piece construction ending at the outer surface of the backs of the plates of the retroreflector. In this eighth embodiment, the retroflector has three optically reflective plates at right angle interfaces (57). The retroreflector assembly has a first mounting element (27) having an interface with the housing (66) and an interface with the retroreflector (77). The housing can be comprised of additional intermediate assemblies such as the intermediate housing member (47) so that the mounting housing interface (67) is between this intermediate housing member (47) and the mounting element (27), instead of the housing directly.

Figure 25:
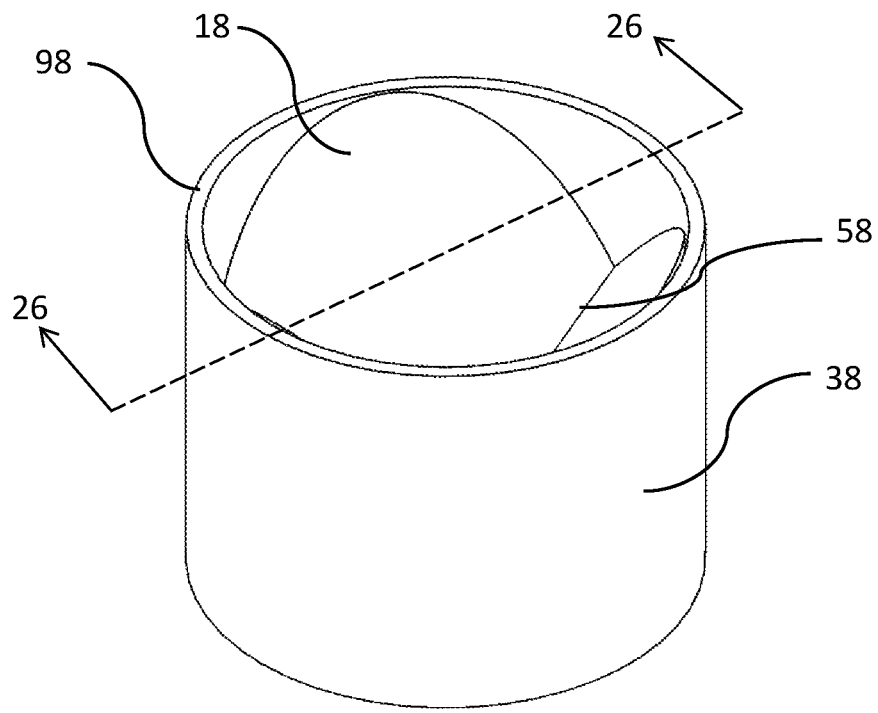
FIG. 25 is a perspective view of a retroreflector assembly, made in accordance with at least the ninth embodiment of the present retroreflector assembly invention.
Figure 26:
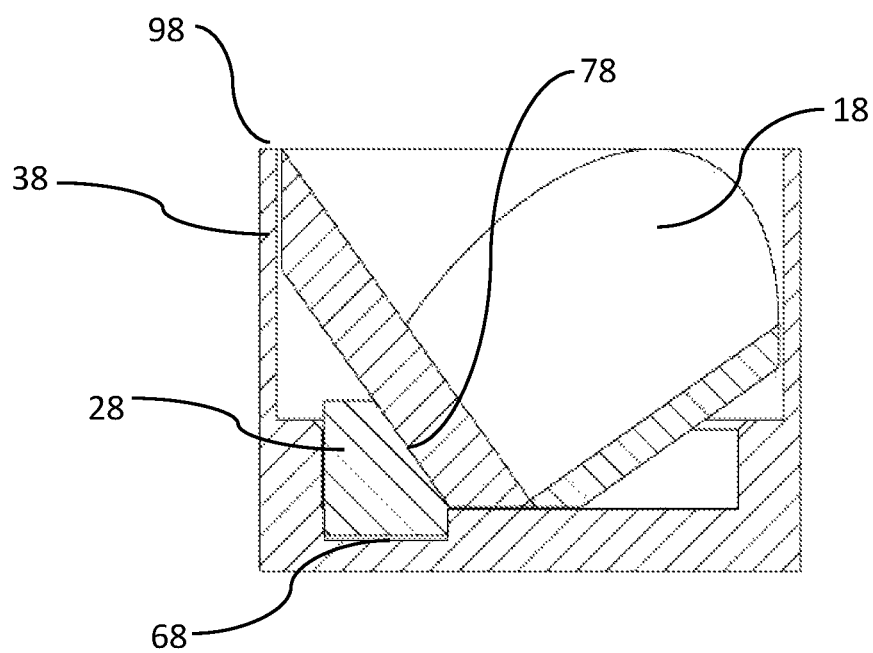
FIG. 26 is a is a cross-sectional view of the retroreflector assembly of FIG. 25, taken along line 26-26 of FIG. 25.
Figure 27:
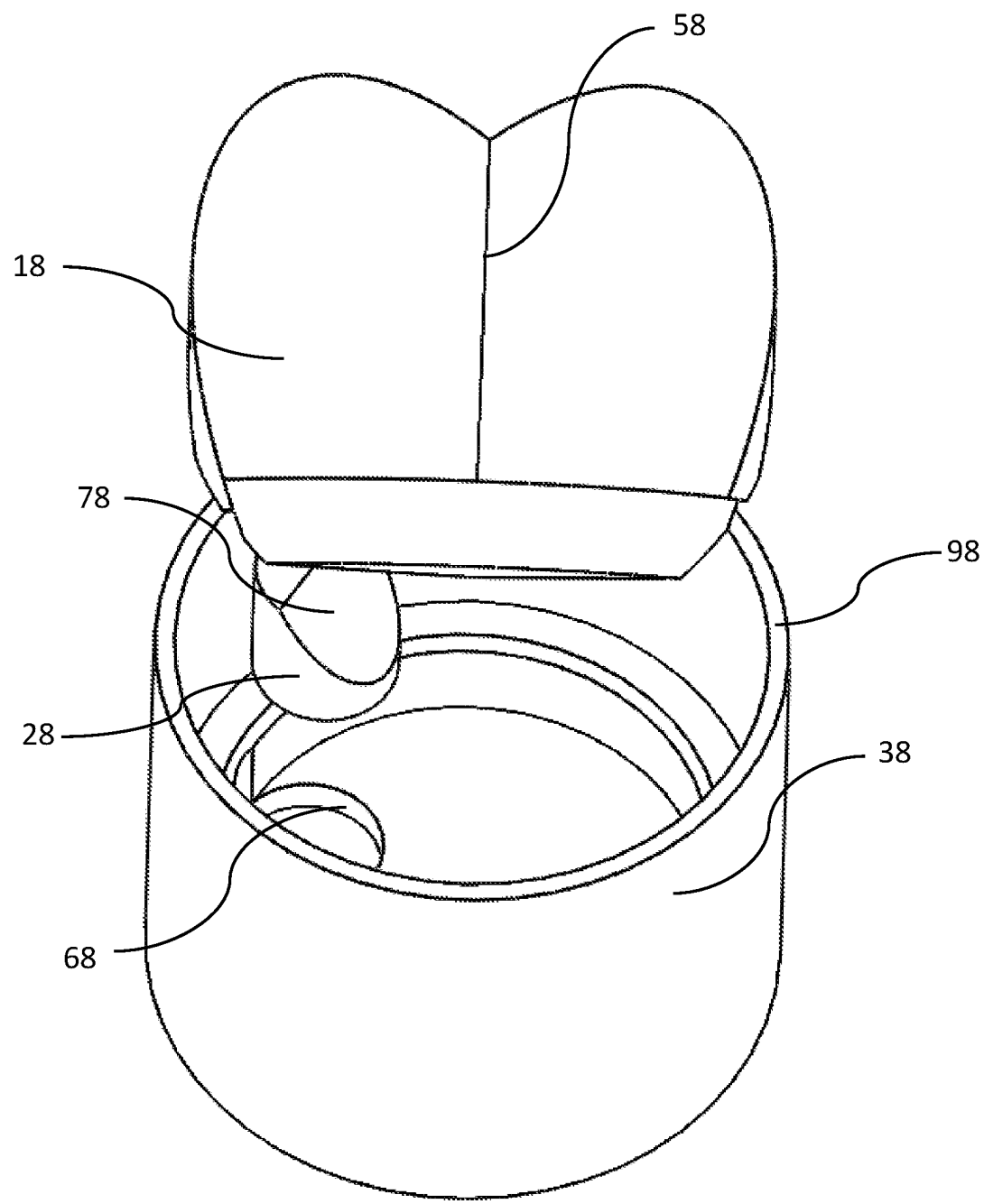
FIG. 27 is a is an exploded perspective view of the retroreflector assembly of FIGS. 25-26.

The ninth preferred embodiment of the retroreflector assembly is depicted in FIGS. 25-27, showing the retroreflector (18) having another design of the housing (38) for receipt of the retroreflector therein, having a single piece construction ending at the topmost edges of the reflective plates but fully enclosed in comparison to FIG. 22-24 as this housing embodiment does not follow the edge of the plates of the retroreflector. In this ninth embodiment, the retroflector has three optically reflective plates at right angle interfaces (58). The retroreflector assembly has a first mounting element (28) having an interface with the housing (68) and an interface with the retroreflector (78).

Figure 28:
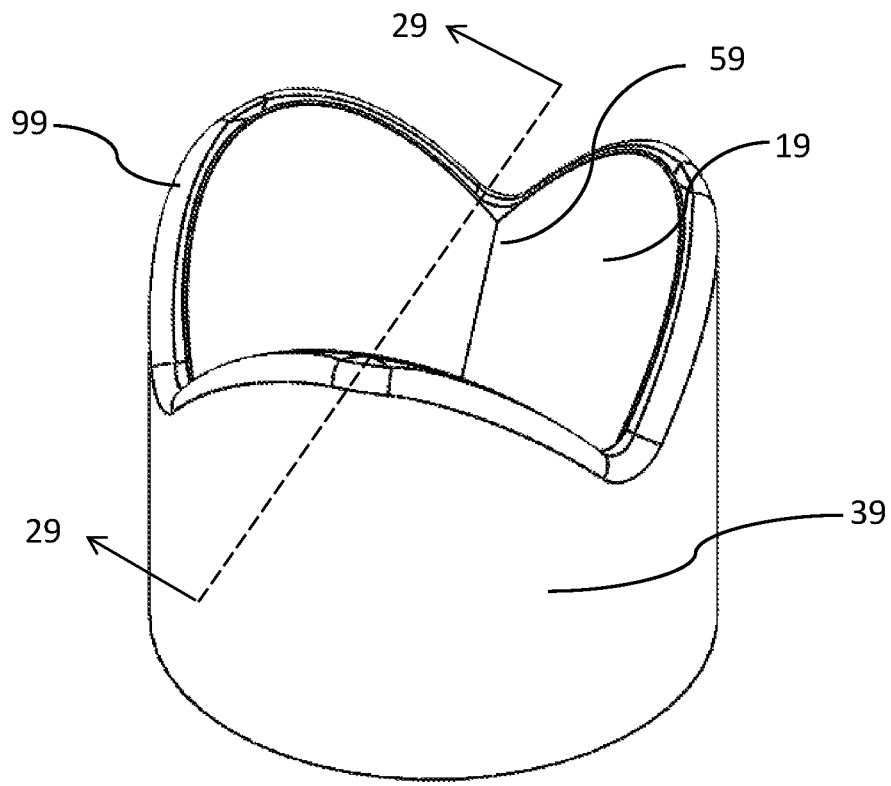
FIG. 28 is a perspective view of a retroreflector assembly, made in accordance with at least the tenth embodiment of the present retroreflector assembly invention.
Figure 29:
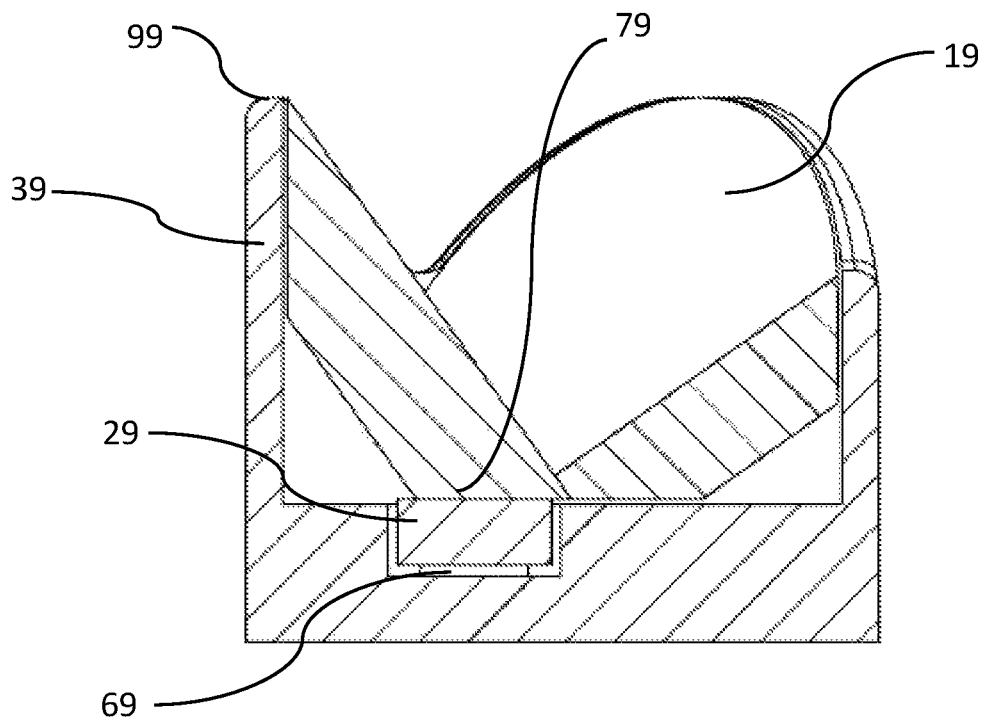
FIG. 29 is a is a cross-sectional view of the retroreflector assembly of FIG. 28, taken along line 29-29 of FIG. 28.
Figure 30:
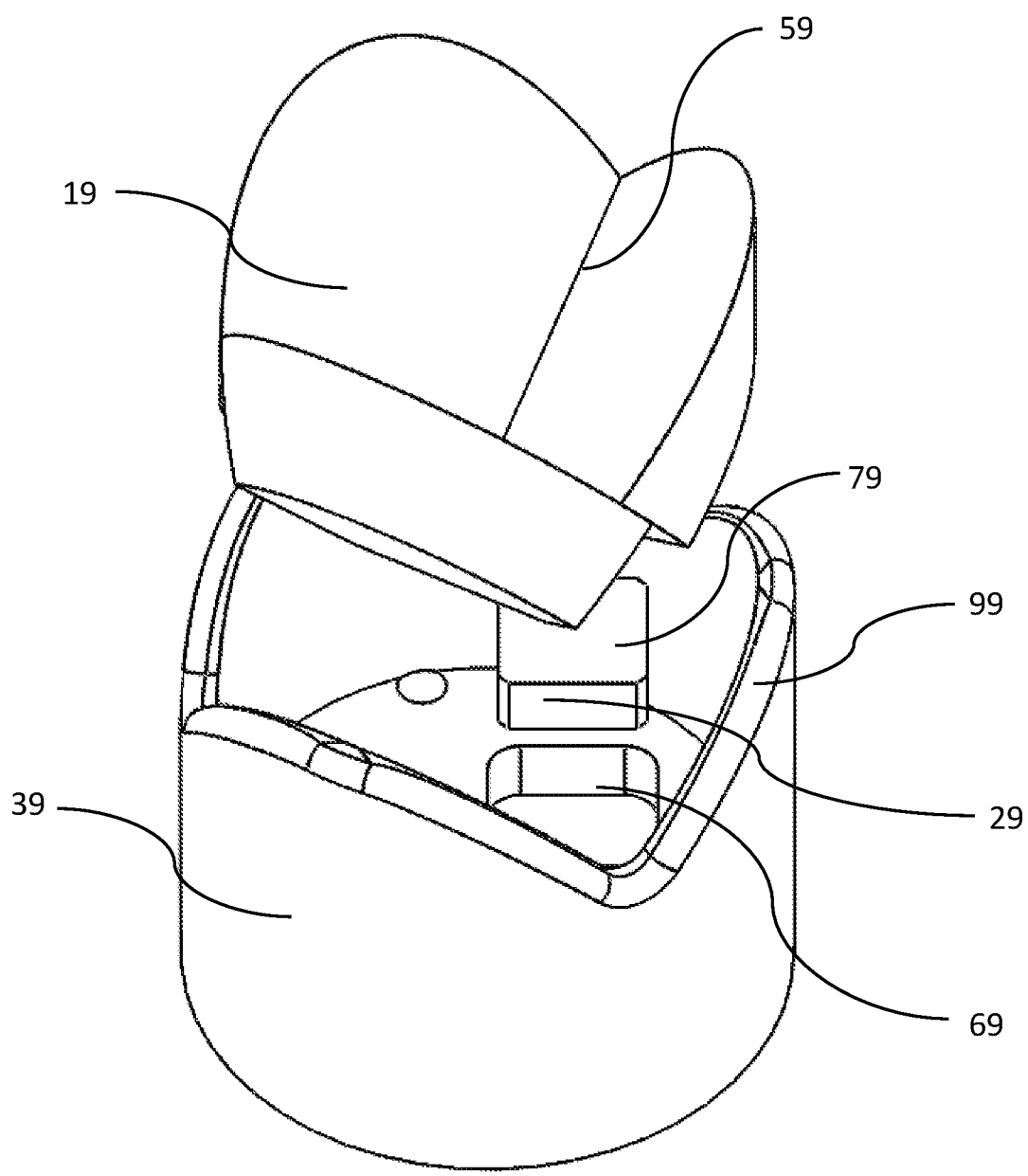
FIG. 30 is a is an exploded perspective view of the retroreflector assembly of FIGS. 28-29.

The tenth preferred embodiment of the retroreflector assembly is depicted in FIGS. 28-30, showing the retroreflector (19) having another design of the housing (39) with optional rounded edges (99) for receipt of the retroreflector therein, having a single-piece rounded-edge (99) construction ending at the outer surface of the back side of the reflective plates. In this tenth embodiment, the retroflector has three optically reflective plates at right angle interfaces (59). The retroreflector assembly has a first mounting element (29) having an interface with the housing (69) and an interface near the apex of the retroreflector (79). The placement of the mounting member(s) and the relevant interface(s) can be at various locations relative to the retroreflector for different design approaches.

Figure 31:
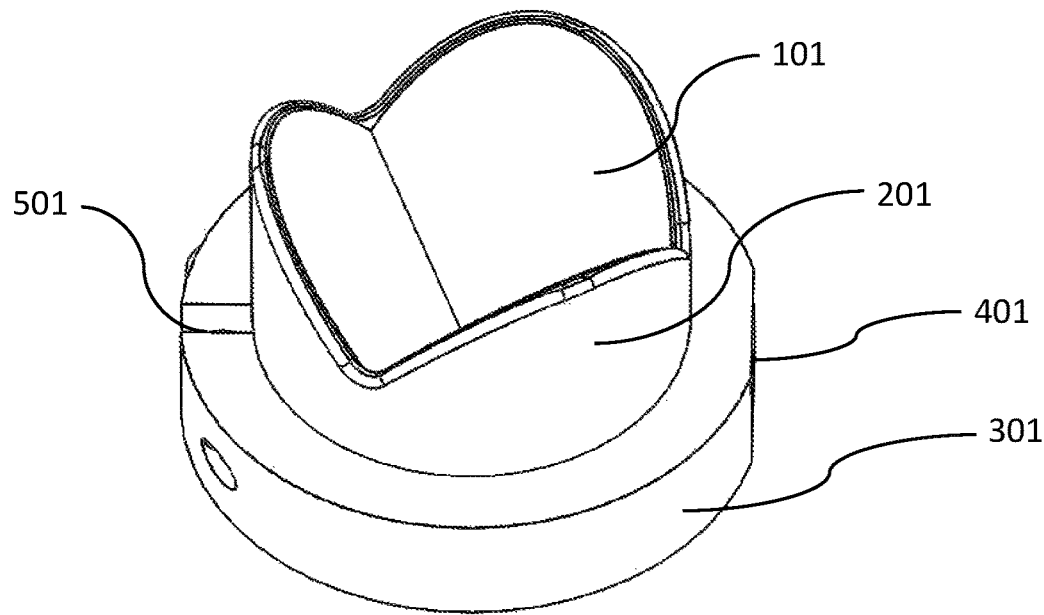
FIG. 31 is a perspective view of a retroreflector assembly, made in accordance with at least the first embodiment of the mounting structures and mounting methods of the present assembly invention.
Figure 32:
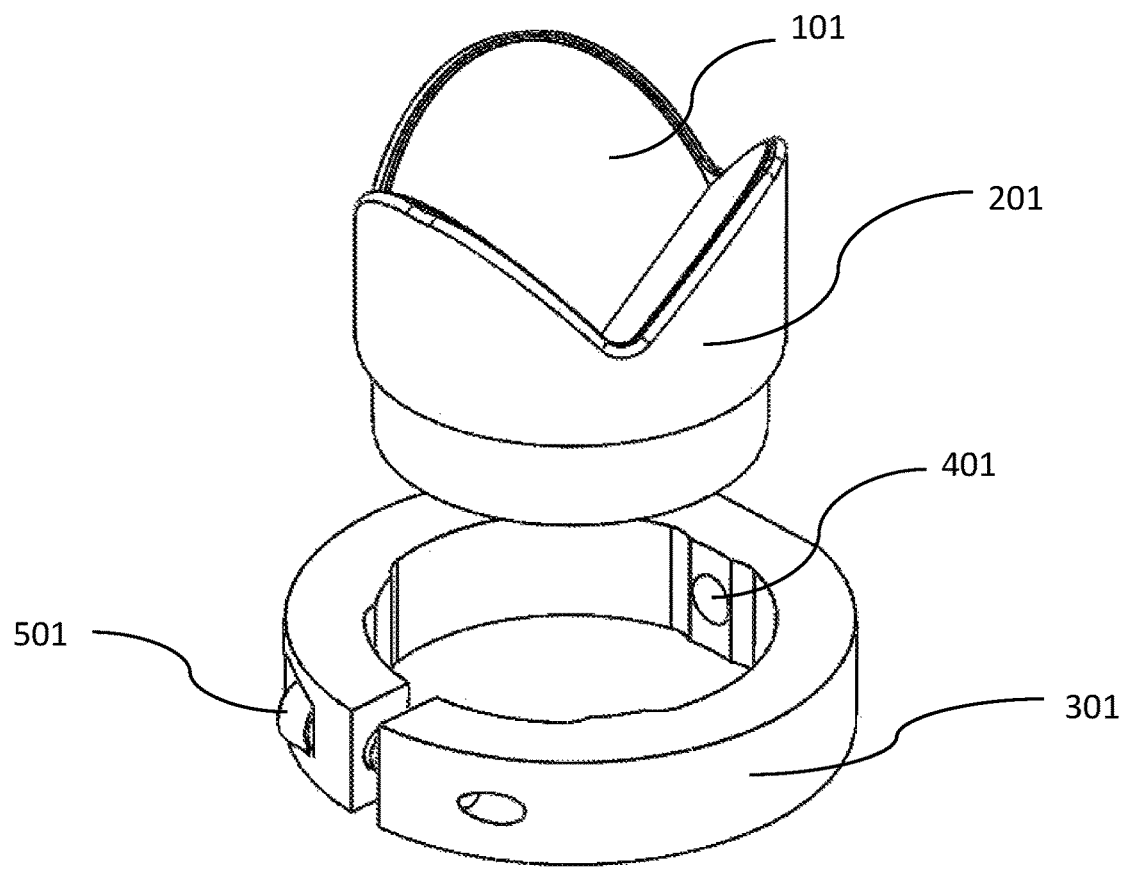
FIG. 32 is a is an exploded perspective view of the retroreflector assembly of FIG. 31.

The retroreflector can also be mounted to another device using various mounting structures and methods. The first preferred embodiment of a mounting structure for the retroreflector is depicted in FIGS. 31-32, showing the retroreflector (101) within the housing (201) having a first mounting structure (301) which is a C-shaped screw clamp. Such a mounting structure can retain the retroreflector assembly to another device and takes advantage in this embodiment of the inset of the housing design. Additional threaded holes sections (401) can be optionally be included to further secure the retroreflector using supplemental set screws (not shown). The main element that retains the retroreflector is the screw means (501) that provides the force to tighten down the clamp around the circumference of the inset of housing.

Figure 33:
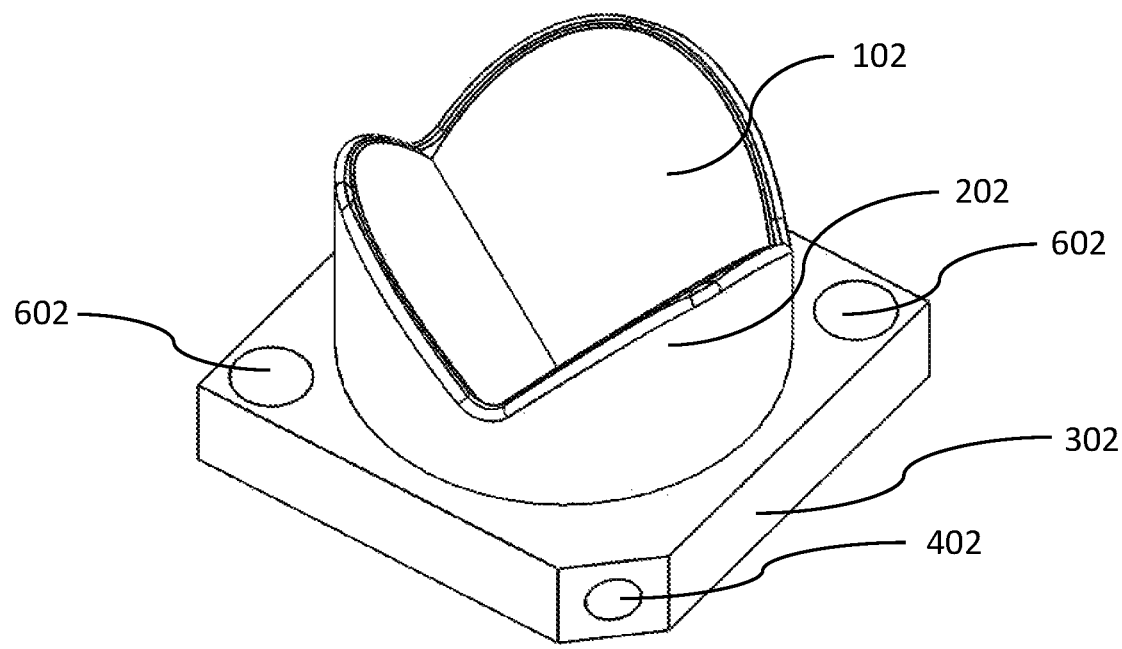
FIG. 33 is a perspective view of a retroreflector assembly, made in accordance with at least the second embodiment of the mounting structures and mounting methods of the present assembly invention.
Figure 34:
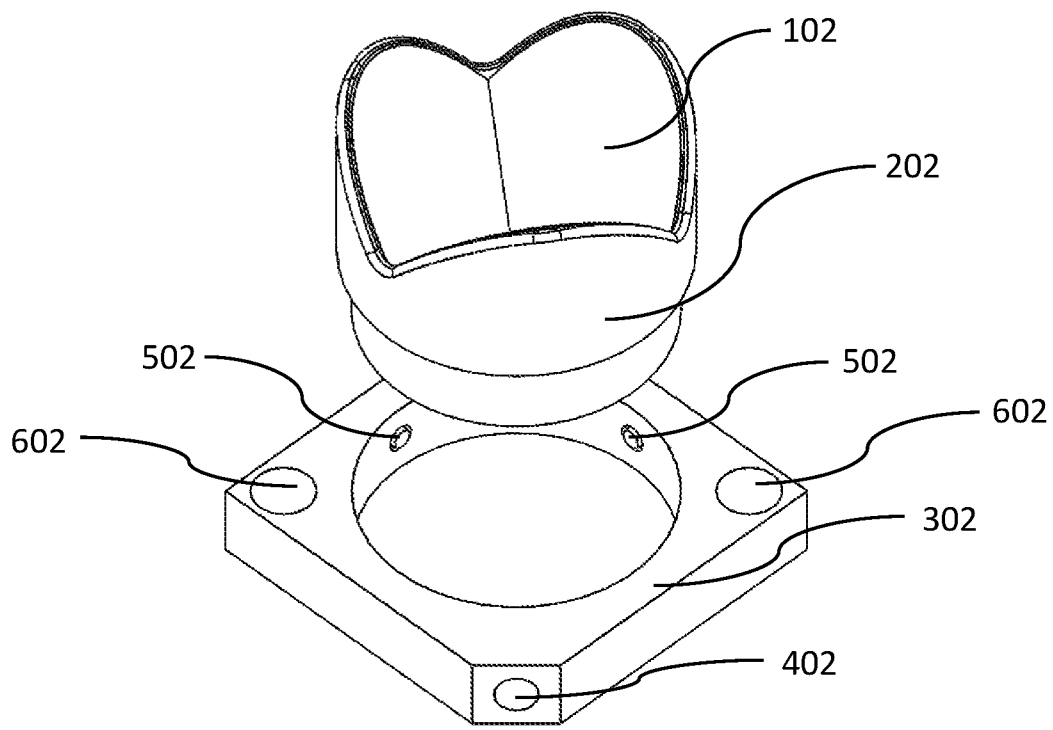
FIG. 34 is a is an exploded perspective view of the retroreflector assembly of FIG. 33.

The second preferred embodiment of a mounting structure for the retroreflector is depicted in FIGS. 33-34, showing the retroreflector (102) within the housing (202) having a first mounting structure (302) which is an interface plate wherein the retroreflector is secured with screws (502) to the interface plate. Additional threaded holes sections (402) can be optionally be included to further secure the retroreflector using supplemental set screws (not shown). The main element that retains the retroreflector assembly to mounting structure (302) is the screw means (502) that comprises a screw (not shown) inserted through the opening shown at (502) so that the head of the screw presses against the inset element of the housing thereby providing the force to secure the retroreflector assembly within the clamping means of this embodiment. The overall combination of the retroreflector assembly in the clamping means can then be secured to another structure (not shown) via holes (602), which can form a bolt pattern that mirrors the structure of the another structure to which it is attached. Although not shown, the means for the mounting the structure to the another structure or surface may include one or more or a combination of, clamps, screws, threads, pins, chemical or material attachment means, tethers, hinges, spring-loaded mechanisms, biased mechanisms, friction-based systems and electronic or actuation systems.

Figure 35:
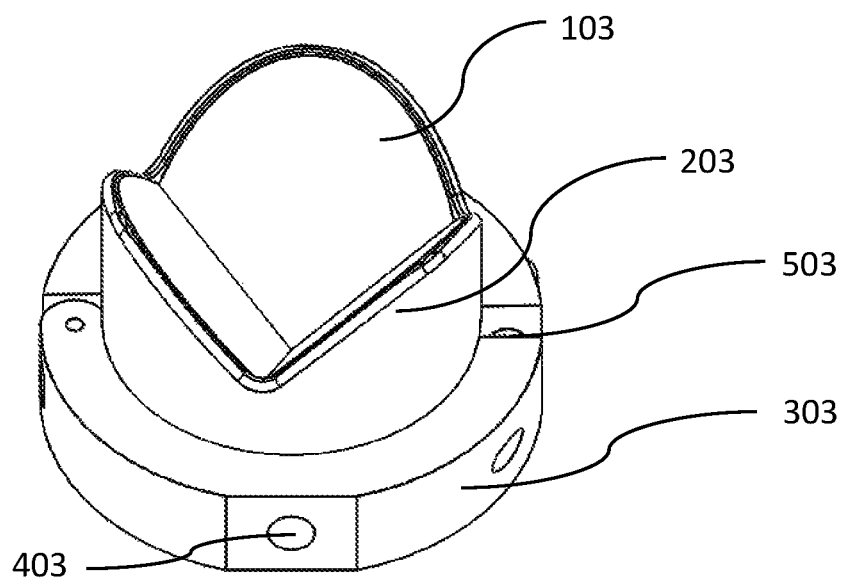
FIG. 35 is a perspective view of a retroreflector assembly, made in accordance with at least the third embodiment of the mounting structures and mounting methods of the present assembly invention.
Figure 36:
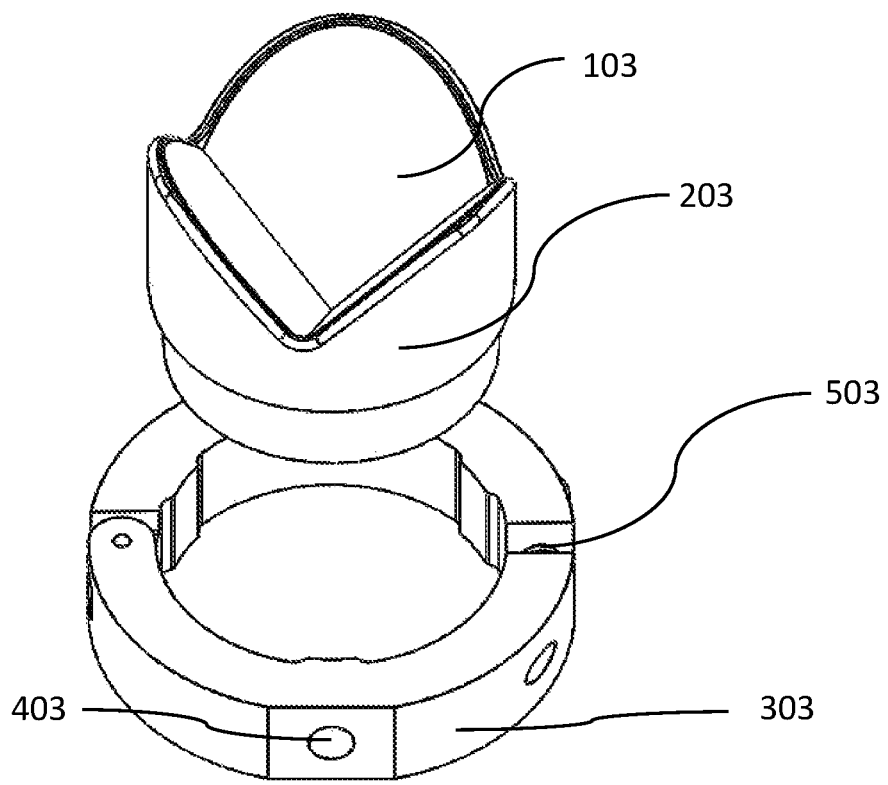
FIG. 36 is a is an exploded perspective view of the retroreflector assembly of FIG. 35.

The third preferred embodiment of a mounting structure for the retroreflector is depicted in FIGS. 35-36, showing the retroreflector (103) within the housing (203) having a first mounting structure (303) which is a hinged-based C-shaped clamp with screw means (503). Additional threaded hole sections (403) can be optionally be included to further secure the retroreflector assembly using supplemental set screws (not shown). The main element that retains the retroreflector assembly is the screw means (503) that provides the force to tighten down the clamp around the circumference of the inset of the housing.

Figure 37:
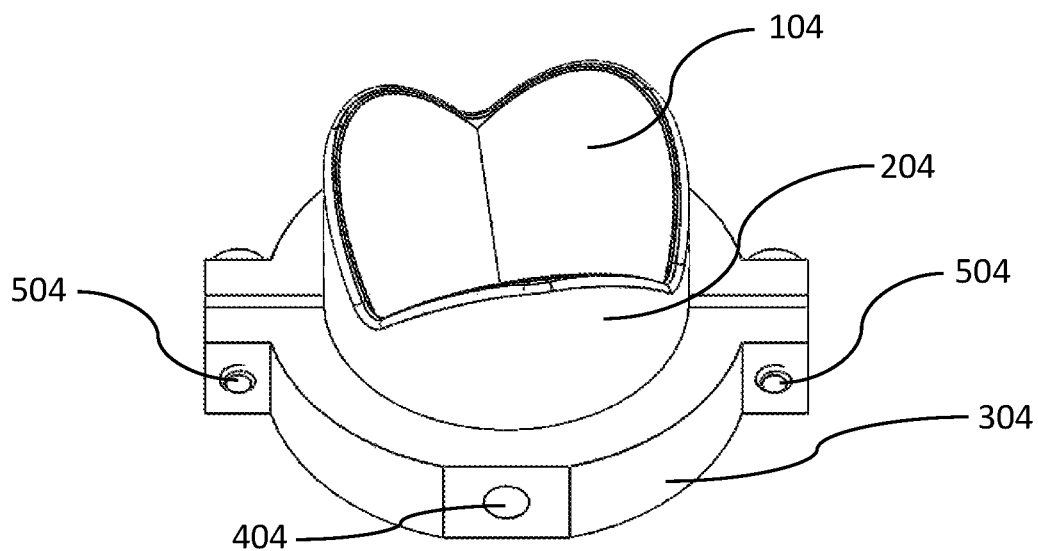
FIG. 37 is a perspective view of a retroreflector assembly, made in accordance with at least the fourth embodiment of the mounting structures and mounting methods of the present assembly invention.
Figure 38:
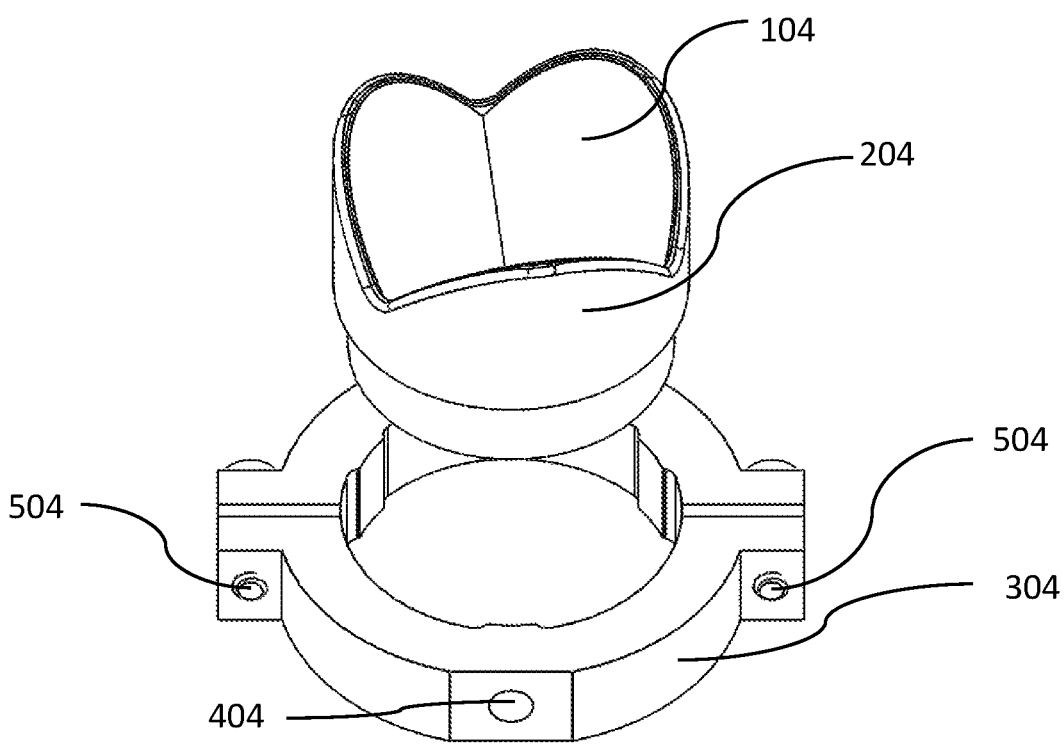
FIG. 38 is a is an exploded perspective view of the retroreflector assembly of FIG. 37.

The fourth preferred embodiment of a mounting structure for the retroreflector is depicted in FIGS. 37-38, showing the retroreflector (104) within the housing (204) having a first mounting structure (304) which is a two-sided clamp or collar with screw means (504). Additional threaded hole sections (404) can be optionally be included to further secure the retroreflector assembly using supplemental set screws (not shown). The main element that retains the retroreflector assembly is the two screw means (504) that provide the force to tighten down the clamp around the circumference of the inset of the housing.

Figure 39:
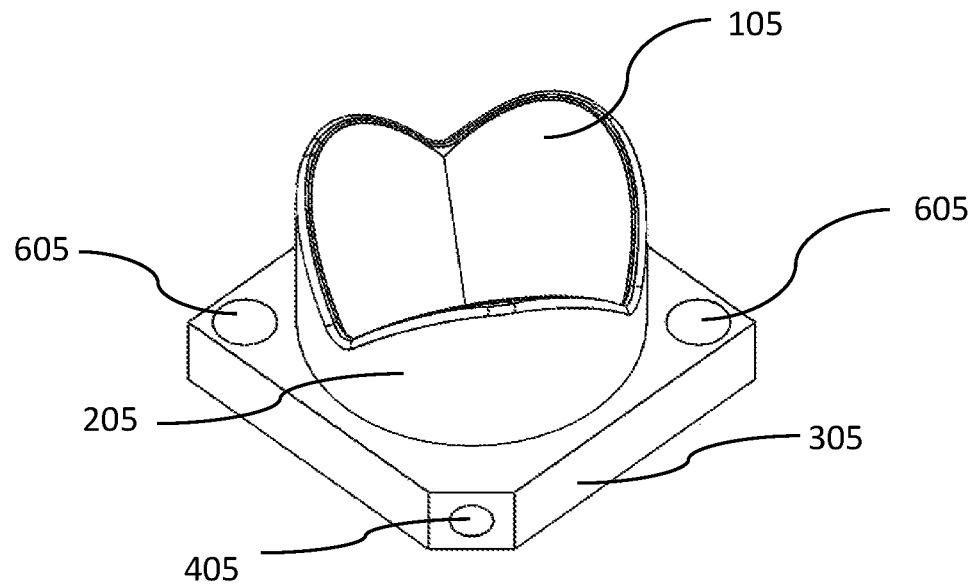
FIG. 39 is a perspective view of a retroreflector assembly, made in accordance with at least the fifth embodiment of the mounting structures and mounting methods of the present assembly invention.
Figure 40:
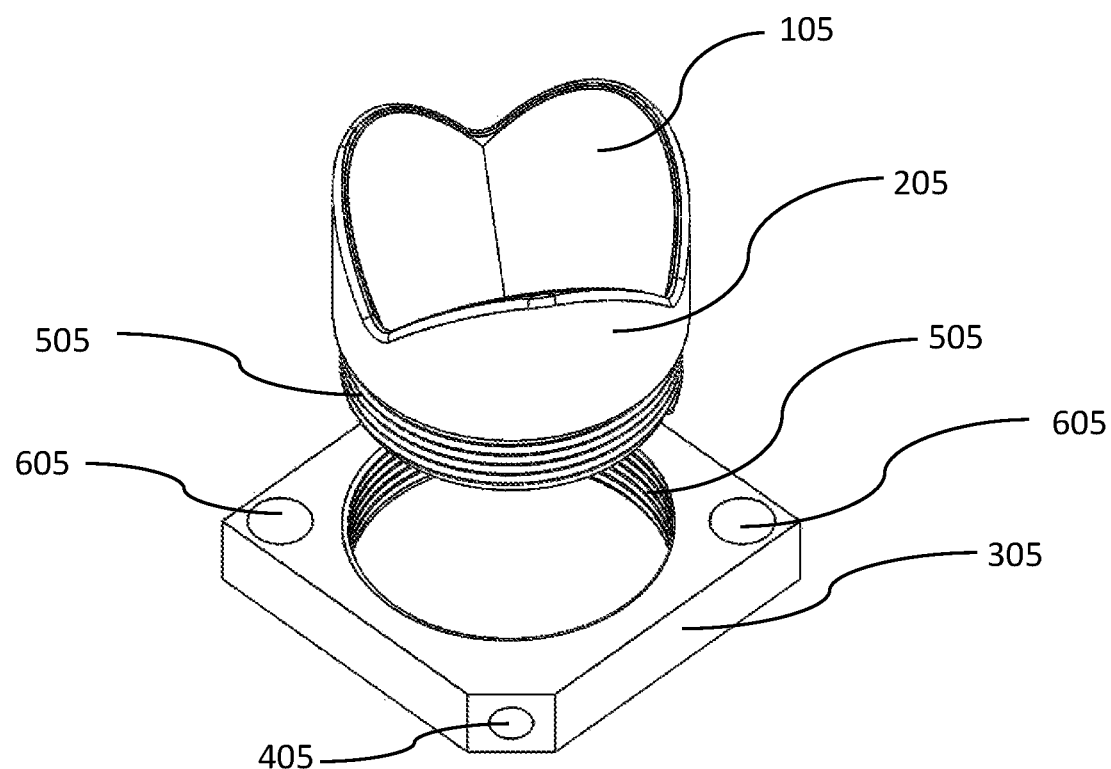
FIG. 40 is a is an exploded perspective view of the retroreflector assembly of FIG. 39.

The fifth preferred embodiment of a mounting structure for the retroreflector is depicted in FIGS. 39-40, showing the retroreflector (105) within the housing (205) having a first mounting structure (305) which is a threaded clamp with screw means (505). Additional threaded hole sections (405) can be optionally included to further secure the retroreflector assembly using supplemental set screws (not shown). The main element that retains the retroreflector assembly is the screw means (505) that provides the force to tighten down the retroreflector assembly to the mounting structure (305). The overall combination of the retroreflector assembly in the clamping means can then be secured to another structure (not shown) via holes (605), which can form a bolt pattern that mirrors the structure of the another structure to which it is attached.

Figure 41:
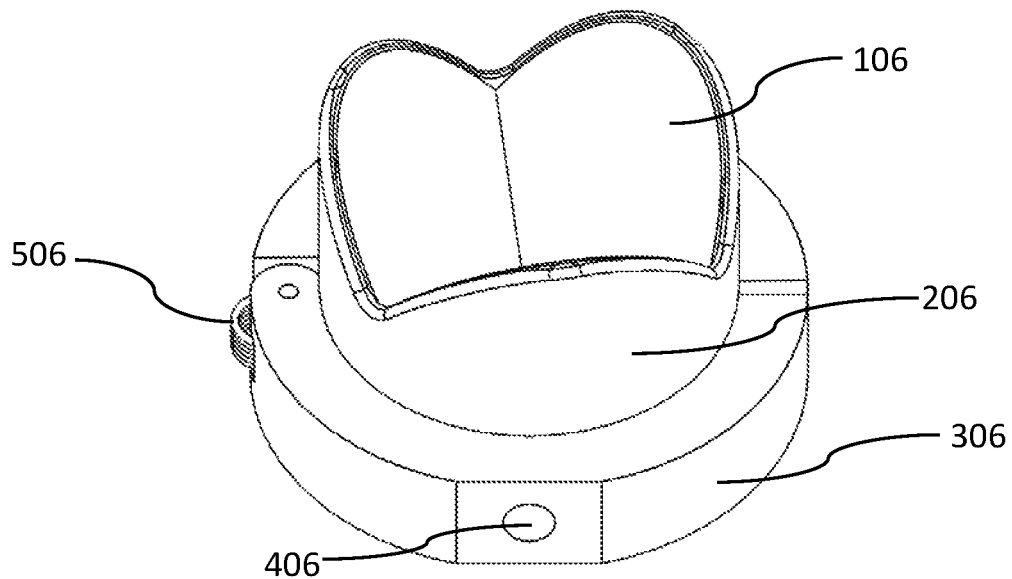
FIG. 41 is a perspective view of a retroreflector assembly, made in accordance with at least the sixth embodiment of the mounting structures and mounting methods of the present assembly invention.
Figure 42:
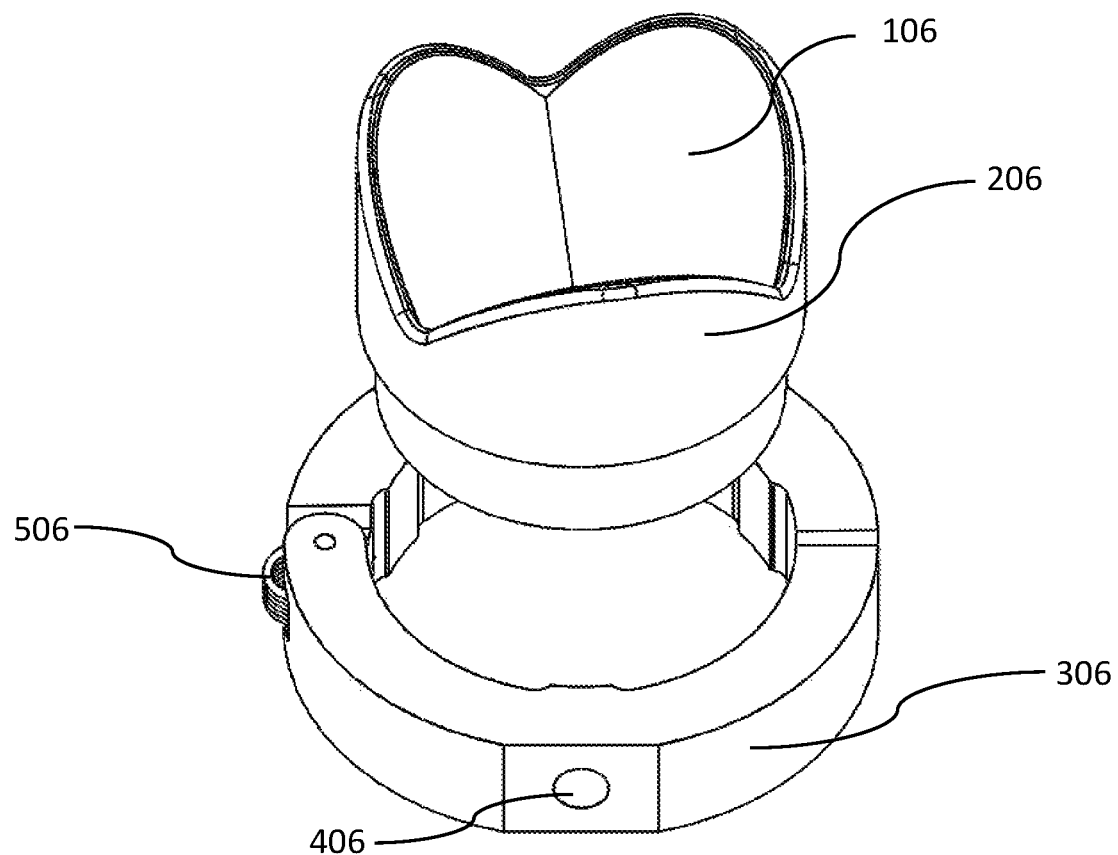
FIG. 42 is a is an exploded perspective view of the retroreflector assembly of FIG. 41.

The sixth preferred embodiment of a mounting structure for the retroreflector is depicted in FIGS. 41-42, showing the retroreflector (106) within the housing (206) having a first mounting structure (306) which is spring loaded C-shaped clamp shown with spring means (506). Additional threaded holes sections (406) can be optionally be included to further secure the retroreflector using supplemental set screws (not shown). The main element that retains the retroreflector is the torsional spring means (506) that provides the force to tighten down the clamp around the circumference of the inset.

Figure 43:
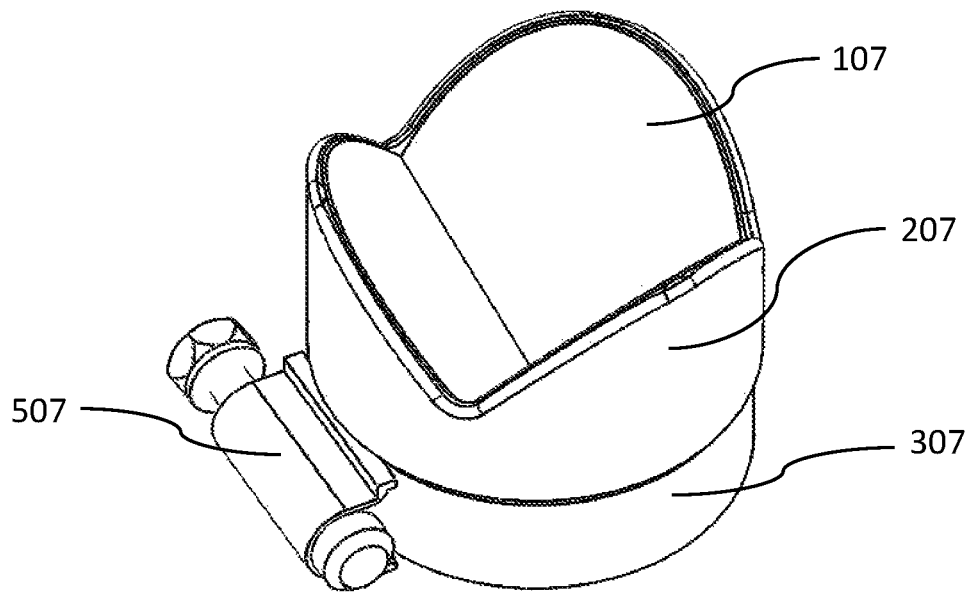
FIG. 43 is a perspective view of a retroreflector assembly, made in accordance with at least the seventh embodiment of the mounting structures and mounting methods of the present assembly invention.
Figure 44:
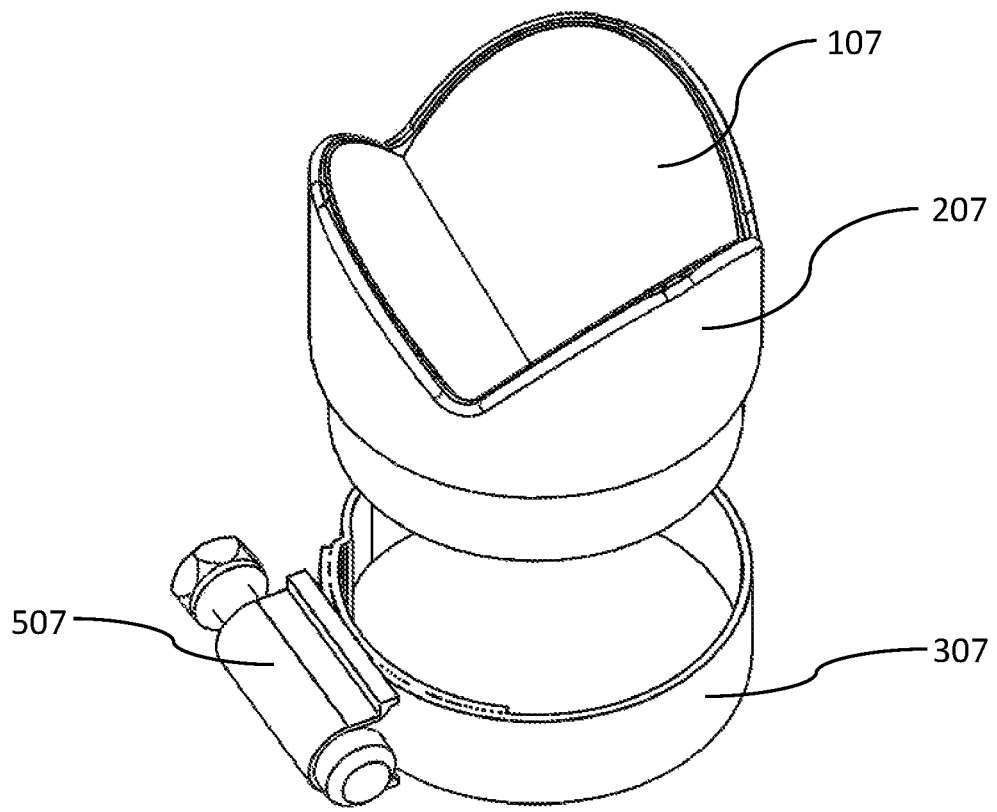
FIG. 44 is a is an exploded perspective view of the retroreflector assembly of FIG. 43.

The seventh preferred embodiment of a mounting structure for the retroreflector is depicted in FIGS. 43-44, showing the retroreflector (107) within the housing (207) having a first mounting structure (307) which is a clamp with screw means (507). The style of the clamp is similar to a hose clamp but any radially thin clamp may be utilized, as the importance of such an embodiment is that the radial thickness of the clamping means is thinner than the inset of the retroreflector housing. Such a design can be then utilized to put two retroreflector assemblies side-to-side as close as tangentially to the maximum external diameter of the retroreflector assembly, which is was described previously as being advantageous to many applications.

Figure 45:
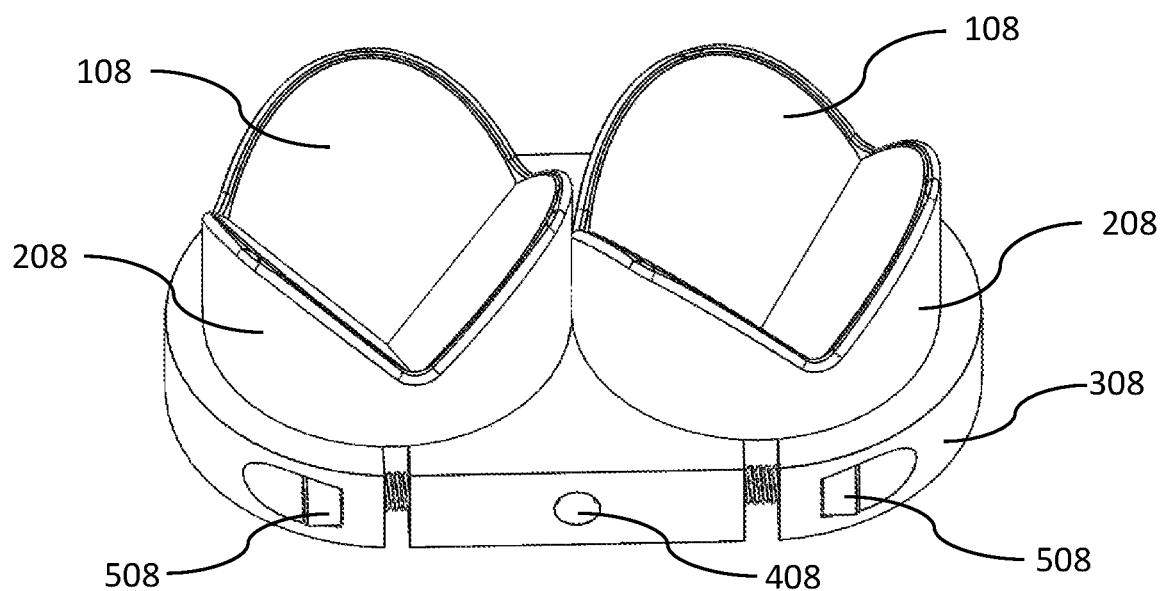
FIG. 45 is a perspective view of a retroreflector assembly, made in accordance with at least the eighth embodiment of the mounting structures and mounting methods of the present assembly invention.
Figure 46:
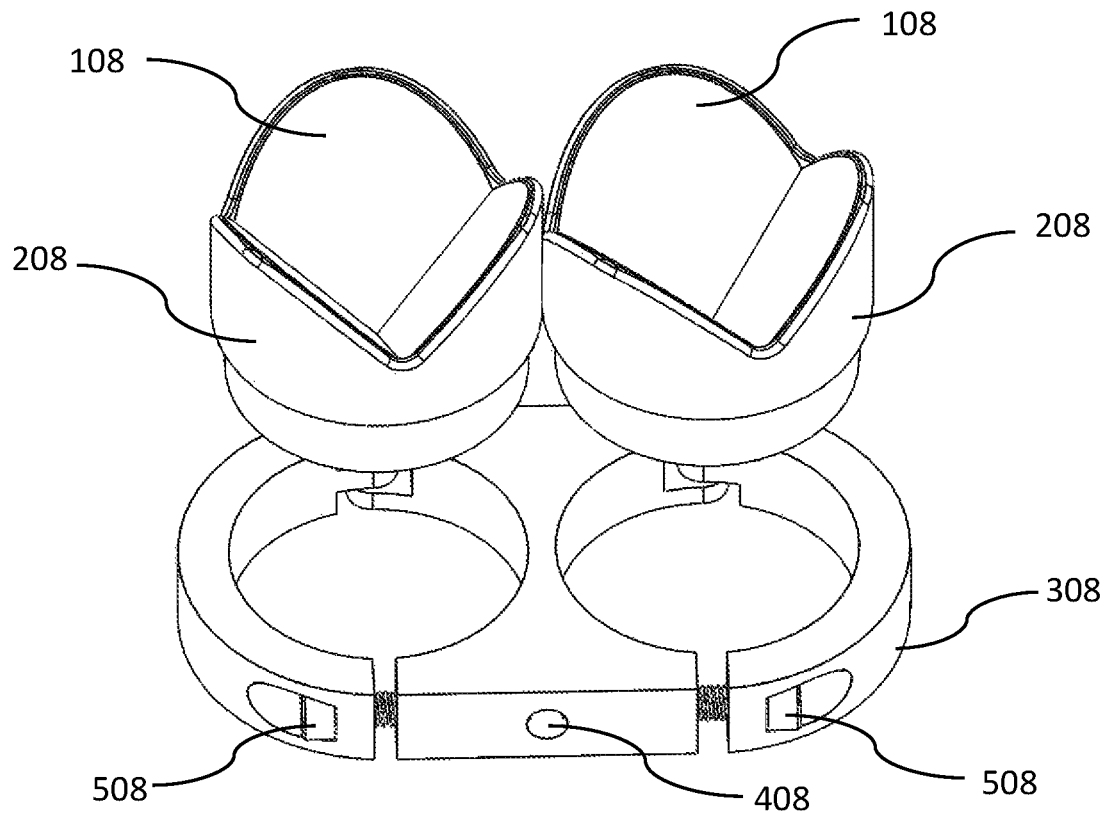
FIG. 46 is a is an exploded perspective view of the retroreflector assembly of FIG. 45.

The eight preferred embodiment of a mounting structure for the retroreflector is depicted in FIGS. 45-46, showing two retroreflectors (108) within the housings (208) having first mounting structures (308) which is hinged-based clamp with screw means (508). This further shows one example of a further embodiment wherein the compact design and clamping means can clamp multiple retroreflectors together in a minimal linear spacing, in this case further simplifying the clamping means by utilizing a single clamp means for two retroreflector assemblies. Additional threaded holes sections (408) can be optionally be included to further secure the retroreflector using supplemental set screws (not shown). The main element that retains the retroreflector is the screw means (508) that provides the force to tighten down the clamp around the circumference of the retroreflector assemblies.

A method for the embodiment of the retroreflector is necessary for the proper functionality of such a device. The method would involve assembling at least the first clamping means to the retroreflector assembly and attaching at least the first clamping means to another device. The process can be ordered such that the clamping means is first attached to at least a first other device or surface, and then to the retroreflector assembly. These method steps may also be done concurrently. Also, multiple retroreflector assemblies may be retained in the same step using the same or multiple clamping means, such as shown just in one example in the embodiment of FIG. 45-46. Other ordering of steps may also be considered that may be advantageous as needed to achieve the final requirements of the retroreflector assembly.

It will thus be seen that the objects set forth above, among those made apparent from the preceding description, are efficiently attained, and, since numerous/certain changes may be made in the above constructions without departing from the spirit and scope of the invention, it is intended that all matter contained in the above description and shown in the accompanying drawings shall only be interpreted as illustrative and not in a limiting sense.

It is also to be understood that the following claims are intended to cover all of the generic and specific features of the invention herein described, and all statements of the scope of the invention which, as a matter of language, might be said to fall therebetween.

The invention claimed is:

1. A retroreflector assembly, comprising:
   a retroreflector, comprising (i) three plates having optically flat reflective surfaces disposed at right angles to each other, (ii) a clear aperture distance, and (iii) an axis aligned equidistantly from the three plates, wherein the axis extends from a vertex of the retroreflector,
   a housing, comprising a plurality of sides configured for at least partially enclosing therein the three plates of the retroreflector and an inset, the housing having a main external diameter that is longer than the clear aperture distance, and an inset diameter that is shorter than the main external diameter,
   at least one mounting element extending from the retroreflector, wherein the mounting element at least partially secures the retroreflector to the housing, the mounting element being positioned below one of the three plates,
   wherein a height of the housing is configured to be smaller in distance than the clear aperture distance in a direction parallel to the axis of the retroreflector, and
   wherein the housing has a connection for securing the housing to a supporting structure, the connection being positioned below one of the three plates without the mounting element, and offset from but parallel to the axis, the connection being positioned in the inset.

2. The retroreflector assembly as recited in claim 1, wherein the mounting element at least partially secures the retroreflector to the housing with a screwless attachment means.

3. The retroreflector assembly as recited in claim 1, the mounting element comprising a mounting pin.

4. The retroreflector assembly as recited in claim 3, wherein the mounting pin extends from one of the three plates of the retroreflector.

5. The retroreflector assembly as recited in claim 1, wherein the retroreflector is further secured to the housing through at least partial contact with a portion of at least one plate to the housing.

6. The retroreflector assembly as recited in claim 5, the housing comprising an interior mounting surface for receipt of the at least partial contact of the portion of the at least one plate.

7. The retroreflector assembly as recited in claim 6, wherein the interior mounting surface of the housing is substantially tangent with at least the three plates of the retroreflector.

8. The retroreflector assembly as recited in claim 7, wherein the housing has a screw or bolt pattern for connection of the housing to the supporting structure.

9. The retroreflector assembly as recited in claim 1, wherein the housing is rotationally symmetric.

10. The retroreflector assembly as recited in claim 1, wherein the housing has different external diameter sections.

11. The retroreflector assembly as recited in claim 1, wherein the housing has a screw or bolt pattern for connection of the housing to the supporting structure.

12. The retroreflector assembly as recited in claim 1, wherein the retroreflector assembly further comprises a ring that can be joined to at least the housing.

13. The retroreflector assembly as recited in claim 1, the retroreflector assembly further comprising clamping means for the assembly to be retained to at least one other device or surface.

14. The retroreflector assembly as recited in claim 13, wherein the clamping means comprises at least one of or any combination of clamps, screws, threads, springs, and hinges.

15. A method for a retroreflector assembly, comprising a retroreflect that includes (i) three plates having optically flat reflective surfaces disposed at right angles to each other, (ii) a clear aperture distance, and (iii) an axis aligned equidistantly from the three plates, wherein the axis includes a vertex of the retroreflector,
   a housing, comprising a plurality of sides configured for at least partially enclosing therein the three plates of the retroreflector and an inset, the housing having a main external diameter that is longer than the clear aperture distance, and an inset diameter that is shorter than the main external diameter,
   at least one clamping means configured to retain the assembly to at least one other device or surface, and
   at least one mounting element extending from the retroreflector,
   wherein the clamping means comprises at least one of or any combination of clamps, screws, threads, springs and hinges,
   wherein the mounting element at least partially secures the retroreflector to the housing,
   wherein the mounting element is positioned below one of the three plates,
   wherein the housing is configured to be shorter than the clear aperture distance in a direction parallel to the axis of the retroreflector,
   wherein the housing has a connection for securing the housing to a supporting structure, the connection being positioned below one of the three plates without the mounting element, and offset from but parallel to the axis, the connection being positioned in the inset and the method comprising the steps of:
      joining at least the clamping means to the retroreflector assembly, and
      attaching at least the clamping means to at least one other device or surface.

16. The method as recited in claim 15, wherein the mounting element comprises a mounting pin.

17. The method as recited in claim 15, comprising the further step of extending the mounting pin from one of the three plates of the retroreflector.

18. The method for the retroreflector assembly as recited in claim 15, wherein the retroreflector is further secured to the housing, comprising a receptacle for receipt therein of the retroreflector assembly, and wherein the housing is in at least partial contact with a portion of at least one plate to the housing.

19. The method for the retroreflector assembly as recited in claim 15, wherein the housing is rotationally symmetric.

20. The method for the retroreflector assembly as recited in claim 15, wherein the housing is approximately tangent with at least the three plates of the retroreflector.

21. The method for the retroreflector assembly as recited in claim 15, wherein the housing has different external diameter sections.

22. The method for the retroreflector assembly as recited in claim 15, wherein the housing has a screw or bolt pattern for connection of the housing to the supporting structure.

23. The method for the retroreflector assembly as recited in claim 15, wherein the retroreflector assembly further comprises a ring that can be joined to at least the housing.

24. The method for the retroreflector assembly as recited in claim 15, wherein the retroreflector assembly further comprises clamping means for the assembly to be retained to another device.

25. A retroreflector assembly, comprising:
- a retroreflector, comprising (i) three plates having optically flat reflective surfaces disposed at right angles to each other, (ii) a clear aperture distance, and (iii) an axis aligned equidistantly from the three plates, wherein the axis extends from a vertex of the retroreflector,
- a housing, comprising a plurality of sides configured for at least partially enclosing therein the three plates of the retroreflector and an inset, the housing having a main external diameter that is longer than the clear aperture distance, and an inset diameter that is shorter than the main external diameter,
- at least one screw-based mounting element extending from the retroreflector, wherein the mounting element at least partially secures the retroreflector to the housing by interfacing directly into one of the plates, and wherein the mounting element is captured within the housing,
- wherein the housing has a connection for securing the housing to a supporting structure, the connection being positioned below one of the three plates without the mounting element, and offset from but parallel to the axis, the connection being positioned in the inset.

* * * * *